(12) United States Patent
Ockenfuss et al.

(10) Patent No.: US 11,567,251 B2
(45) Date of Patent: *Jan. 31, 2023

(54) SENSOR WINDOW CONFIGURED TO PASS NEAR-INFRARED LIGHT AND TO REFLECT COLORS OF LIGHT DIFFERENT FROM A COLOR OF A SURFACE ADJACENT TO THE WINDOW

(71) Applicant: VIAVI Solutions Inc., San Jose, CA (US)

(72) Inventors: Georg J. Ockenfuss, Santa Rosa, CA (US); Scott Rowlands, Santa Rosa, CA (US); Markus Bilger, Santa Rosa, CA (US); Jerry Zieba, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,274

(22) Filed: Apr. 29, 2021

(65) Prior Publication Data

US 2021/0247555 A1  Aug. 12, 2021

Related U.S. Application Data

(63) Continuation of application No. 16/293,539, filed on Mar. 5, 2019, now Pat. No. 11,009,636, which is a (Continued)

(51) Int. Cl.
  *G02B 5/28* (2006.01)
  *G01J 1/04* (2006.01)

(52) U.S. Cl.
  CPC ............ *G02B 5/281* (2013.01); *G01J 1/0488* (2013.01)

(58) Field of Classification Search
  CPC ......... H01L 27/14621; H01L 27/14623; H01L 27/14629; G01J 1/0488; G01J 1/06;
  (Continued)

(56) References Cited

U.S. PATENT DOCUMENTS

| 3,914,023 A | 10/1975 | Thelen |
| 4,229,066 A | 10/1980 | Rancourt et al. |

(Continued)

FOREIGN PATENT DOCUMENTS

| CN | 104345364 A | 2/2015 |
| CN | 107015302 A | 8/2017 |

(Continued)

OTHER PUBLICATIONS

Anonymous., "Color Difference—Wikipedia", May 31, 2017, XP055385217, 6 pages, [retrieved on Jun. 26, 2017] Retrieved from the Internet [URL: https://en.wikipedia.org/wiki/Colordifference].

(Continued)

*Primary Examiner* — Que Tan Le
(74) *Attorney, Agent, or Firm* — Harrity & Harrity, LLP

(57) ABSTRACT

A sensor window may include a substrate and a set of layers disposed onto the substrate. The set of layers may include a first subset of layers of a first refractive index and a second set of layers of a second refractive index different from the first refractive index. The set of layers may be associated with a threshold transmissivity in a sensing spectral range. The set of layers may be configured to a particular color in a visible spectral range and may be associated with a threshold opacity in the visible spectral range.

20 Claims, 25 Drawing Sheets
(10 of 25 Drawing Sheet(s) Filed in Color)

Related U.S. Application Data continuation-in-part of application No. 16/103,625, filed on Aug. 14, 2018, now Pat. No. 10,948,640.

(60) Provisional application No. 62/642,354, filed on Mar. 13, 2018.

(58) Field of Classification Search
CPC .......... G01J 2001/061; G01J 2001/063; G02B 5/281; G02B 5/282
USPC ........................................ 250/226, 216, 239
See application file for complete search history.

(56) References Cited

U.S. PATENT DOCUMENTS

| | | | |
|---|---|---|---|
| RE33,729 E | 10/1991 | Perilloux | |
| 5,398,133 A | 3/1995 | Tsai et al. | |
| 6,537,673 B2 | 3/2003 | Sada et al. | |
| 7,348,586 B2 | 3/2008 | Ishikawa et al. | |
| 9,354,369 B2 | 5/2016 | Hendrix et al. | |
| 9,711,551 B2 * | 7/2017 | Silsby | H01L 27/14621 |
| 10,170,509 B2 | 1/2019 | Ockenfuss | |
| 10,473,836 B2 | 11/2019 | Nagaya et al. | |
| 10,580,341 B2 | 3/2020 | Jia et al. | |
| 10,948,640 B2 | 3/2021 | Ockenfuss et al. | |
| 10,996,105 B2 | 5/2021 | Nagaya et al. | |
| 2008/0316594 A1 | 12/2008 | Hashiguchi et al. | |
| 2015/0029582 A1 | 1/2015 | Chang et al. | |
| 2015/0369980 A1 | 12/2015 | Ockenfuss et al. | |
| 2017/0186794 A1 | 6/2017 | Ockenfuss | |
| 2018/0306954 A1 | 10/2018 | Koyama et al. | |
| 2019/0285785 A1 | 9/2019 | Ockenfuss et al. | |
| 2019/0370447 A1 | 12/2019 | Houck et al. | |

FOREIGN PATENT DOCUMENTS

| | | |
|---|---|---|
| CN | 107037520 A | 8/2017 |
| EP | 3187909 A1 | 7/2017 |
| EP | 3187910 A1 | 7/2017 |
| EP | 3330753 A1 | 6/2018 |
| EP | 3407103 A1 | 11/2018 |
| EP | 3435123 A1 | 1/2019 |
| EP | 3588152 A2 | 1/2020 |
| JP | 2002116318 A | 4/2002 |
| JP | 2006023602 A | 1/2006 |
| JP | 2006165493 A | 6/2006 |
| JP | 2010072616 A | 4/2010 |
| JP | 2012088694 A | 5/2012 |
| JP | 2017126742 A | 7/2017 |
| JP | 2017161897 A | 9/2017 |
| JP | 2017526945 A | 9/2017 |
| JP | 2017179816 A | 10/2017 |
| KR | 20140123797 A | 10/2014 |
| TW | 201710715 A | 3/2017 |
| TW | 201721188 A | 6/2017 |
| TW | 201732324 A | 9/2017 |
| WO | 2011001983 A1 | 1/2011 |
| WO | 2015195123 A1 | 12/2015 |
| WO | 2017130934 A1 | 8/2017 |

OTHER PUBLICATIONS

Extended European Search Report for Application No. EP19162149.9, dated Mar. 18, 2020, 15 pages.

Partial European Search Report for Application No. EP19162149.9, dated Nov. 27, 2019, 17 pages.

* cited by examiner

| | Material | thickness [nm] |
|---|---|---|
| | substrate | |
| 1 | H | 19.0 |
| 2 | L | 57.8 |
| 3 | H | 193.2 |
| 4 | L | 265.5 |
| | air | |

Second Side of Sensor Window

| | Material | thickness [nm] |
|---|---|---|
| | substrate | |
| 1 | H | 37.0 |
| 2 | L | 85.9 |
| 3 | H | 54.2 |
| 4 | L | 89.9 |
| 5 | H | 54.3 |
| 6 | L | 33.9 |
| 7 | H | 177.2 |
| 8 | L | 74.9 |
| 9 | H | 60.3 |
| 10 | L | 37.4 |
| 11 | H | 168.1 |
| 12 | L | 80.9 |
| 13 | H | 156.6 |
| 14 | L | 67.4 |
| 15 | H | 83.4 |
| 16 | L | 55.2 |
| 17 | H | 152.5 |
| 18 | L | 60.6 |
| 19 | H | 10.8 |
| 20 | L | 31.2 |
| 21 | H | 71.0 |
| 22 | L | 21.4 |
| 23 | H | 79.2 |
| 24 | L | 26.0 |
| 25 | H | 10.8 |
| 26 | L | 34.5 |
| 27 | H | 8.3 |
| 28 | L | 41.6 |
| 29 | H | 5.3 |
| 30 | L | 104.0 |
| | air | |

440

First Side of Sensor Window

| | Material | thickness |
|---|---|---|
| 1 | H | 34.82439 |
| 2 | L | 71.69014 |
| 3 | H | 38.61091 |
| 4 | L | 106.6525 |
| 5 | H | 191.4464 |
| 6 | L | 19.77825 |
| 7 | H | 51.49471 |
| 8 | L | 36.44171 |
| 9 | H | 40.71902 |
| 10 | L | 67.21742 |
| 11 | H | 165.0878 |
| 12 | L | 92.51144 |
| 13 | H | 86.61316 |
| 14 | L | 34.43134 |
| 15 | H | 52.66847 |
| 16 | L | 33.866 |
| 17 | H | 92.17228 |
| 18 | L | 60.19471 |
| 19 | H | 150.4909 |
| 20 | L | 41.19789 |
| 21 | H | 10.96868 |
| 22 | L | 44.00371 |
| 23 | H | 143.7572 |
| 24 | L | 58.48661 |
| 25 | H | 8.869914 |
| 26 | L | 69.16792 |
| 27 | H | 20.04361 |
| 28 | L | 13.62868 |
| 29 | H | 92.27165 |
| 30 | L | 21.54757 |
| 31 | H | 8.317721 |
| 32 | L | 90.83296 |
| | air | |

First Side of Sensor Window

| | Material | thickness [nm] |
|---|---|---|
| | substrate | |
| 1 | H | 8.5 |
| 2 | L | 48.6 |
| 3 | H | 118.8 |
| 4 | L | 164.6 |
| | air | |

Second Side of Sensor Window

FIG. 5D

First Side of Sensor Window

| | Material | thickness [nm] |
|---|---|---|
| | substrate | |
| 1 | H | 36.9 |
| 2 | L | 64.2 |
| 3 | H | 40.9 |
| 4 | L | 128.9 |
| 5 | H | 265.5 |
| 6 | L | 69.1 |
| 7 | H | 264.2 |
| 8 | L | 103.0 |
| 9 | H | 100.3 |
| 10 | L | 46.5 |
| 11 | H | 35.6 |
| 12 | L | 61.1 |
| 13 | H | 97.0 |
| 14 | L | 71.1 |
| 15 | H | 171.6 |
| 16 | L | 58.4 |
| 17 | H | 14.5 |
| 18 | L | 22.2 |
| 19 | H | 152.2 |
| 20 | L | 59.4 |
| 21 | H | 13.5 |
| 22 | L | 45.2 |
| 23 | H | 237.5178 |
| 24 | L | 26.11864 |
| 25 | H | 13.13221 |
| 26 | L | 48.65809 |
| 27 | H | 48.78339 |
| 28 | L | 44.83307 |
| 29 | H | 65.39028 |
| 30 | L | 31.05811 |
| 31 | H | 69.64244 |
| 32 | L | 42.68758 |
| 33 | H | 48.61115 |
| 34 | L | 38.81367 |
| 35 | H | 86.30498 |
| 36 | L | 33.5764 |
| 37 | H | 42.42744 |
| 38 | L | 53.21045 |
| 39 | H | 171.6623 |
| 40 | L | 39.36942 |
| 41 | H | 49.68694 |
| 42 | L | 31.27025 |
| 43 | H | 171.6279 |
| 44 | L | 111.5455 |

Second Side of Sensor Window

| | Material | thickness [nm] |
|---|---|---|
| | substrate | |
| 1 | H | 8.5 |
| 2 | L | 48.6 |
| 3 | H | 118.8 |
| 4 | L | 164.6 |
| | air | |

SENSOR WINDOW CONFIGURED TO PASS NEAR-INFRARED LIGHT AND TO REFLECT COLORS OF LIGHT DIFFERENT FROM A COLOR OF A SURFACE ADJACENT TO THE WINDOW

RELATED APPLICATION(S)

This application is a continuation of U.S. patent application Ser. No. 16/293,539, filed Mar. 5, 2019, which is a continuation-in-part (CIP) of U.S. patent application Ser. No. 16/103,625, filed Aug. 14, 2018 (now U.S. Pat. No. 10,948,640), which claims priority under 35 U.S.C. § 119 to U.S. Provisional Patent Application No. 62/642,354, filed on Mar. 13, 2018, the contents of which are incorporated by reference herein in their entirety.

BACKGROUND

An optical receiver, such as a sensor element array, may receive light that is directed toward the optical receiver. For example, in an object detection system, a sensor element array may be utilized to capture information about one or more wavelengths of light. The sensor element array may include a set of sensor elements (e.g., optical sensors, spectral sensors, and/or image sensors) that capture the information about the one or more wavelengths of light. An optical transmitter may emit light that is directed toward an object. For example, in the object detection system, the optical transmitter may transmit near-infrared light toward an object, and the near-infrared light may be reflected off the object toward the sensor element array. In this case, based on the information captured by the sensor element array, the object may be detected. For example, in a vehicle context, a device may use the information to generate a three dimensional representation of the object, and to identify a proximity of the object, thereby enabling object avoidance by the vehicle.

In another example, information captured by an optical receiver, such as a sensor element array, may be used to recognize a characteristic of an object (e.g., a distance to the object, a size of the object, a shape of the object, a spectroscopic signature of the object, a type of the object, a speed of the object, etc.), an identity of a person, a characteristic of the person (e.g., a height, a weight, a speed of movement, a health characteristic, etc.), and/or the like. However, during transmission of the near-infrared light toward the user or object and/or during reflection from the user or object toward the optical receiver, ambient light may interfere with the near-infrared light. Thus, the optical receiver may be optically coupled to an optical filter, such as a bandpass filter, to filter ambient light and to allow near-infrared light to pass through toward the optical receiver. Moreover, when performing sensing of multiple wavelengths of light, a filter may be provided to ensure that each wavelength of light, of the multiple wavelengths of light, is directed to a different sensor element of a sensor element array.

SUMMARY

According to some possible implementations, a sensor window may include a substrate and a set of layers disposed onto the substrate. The set of layers may include a first subset of layers of a first refractive index and a second set of layers of a second refractive index different from the first refractive index. The set of layers may be associated with a threshold transmissivity in a sensing spectral range. The set of layers may be configured to a particular color in a visible spectral range and may be associated with a threshold opacity in the visible spectral range.

According to some possible implementations, an optical filter may include a plurality of layers. The plurality of layers may include a set of high refractive index layers associated with a first refractive index and a set of low refractive index layers associated with a second refractive index that is less than the first refractive index. The plurality of layers may form a plurality of channels to direct a plurality of wavelengths of light. The plurality of layers may be associated with a threshold transmissivity in a sensing spectral range and a threshold opacity in a visible spectral range.

According to some possible implementations, a system may include a set of optical sensors disposed on or in a substrate and a sensor window deposited in an optical path of the set of optical sensors. The sensor window may include at least one layer configured to provide greater than 80% opacity at a first spectral range and for angles of incidence from approximately 0 degrees to approximately 45 degrees and to provide greater than 80% transmissivity at a second spectral range, which is different from the first spectral range, and for angles of incidence from approximately 0 degrees to approximately 45 degrees.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-4E are diagrams of an example of characteristics of a sensor window described herein.

FIGS. 5A-5D are diagrams of an example of characteristics of a sensor window described herein.

FIGS. 8A-8E are diagrams of an example of characteristics of a sensor window described herein.

DETAILED DESCRIPTION

Figure 1A:
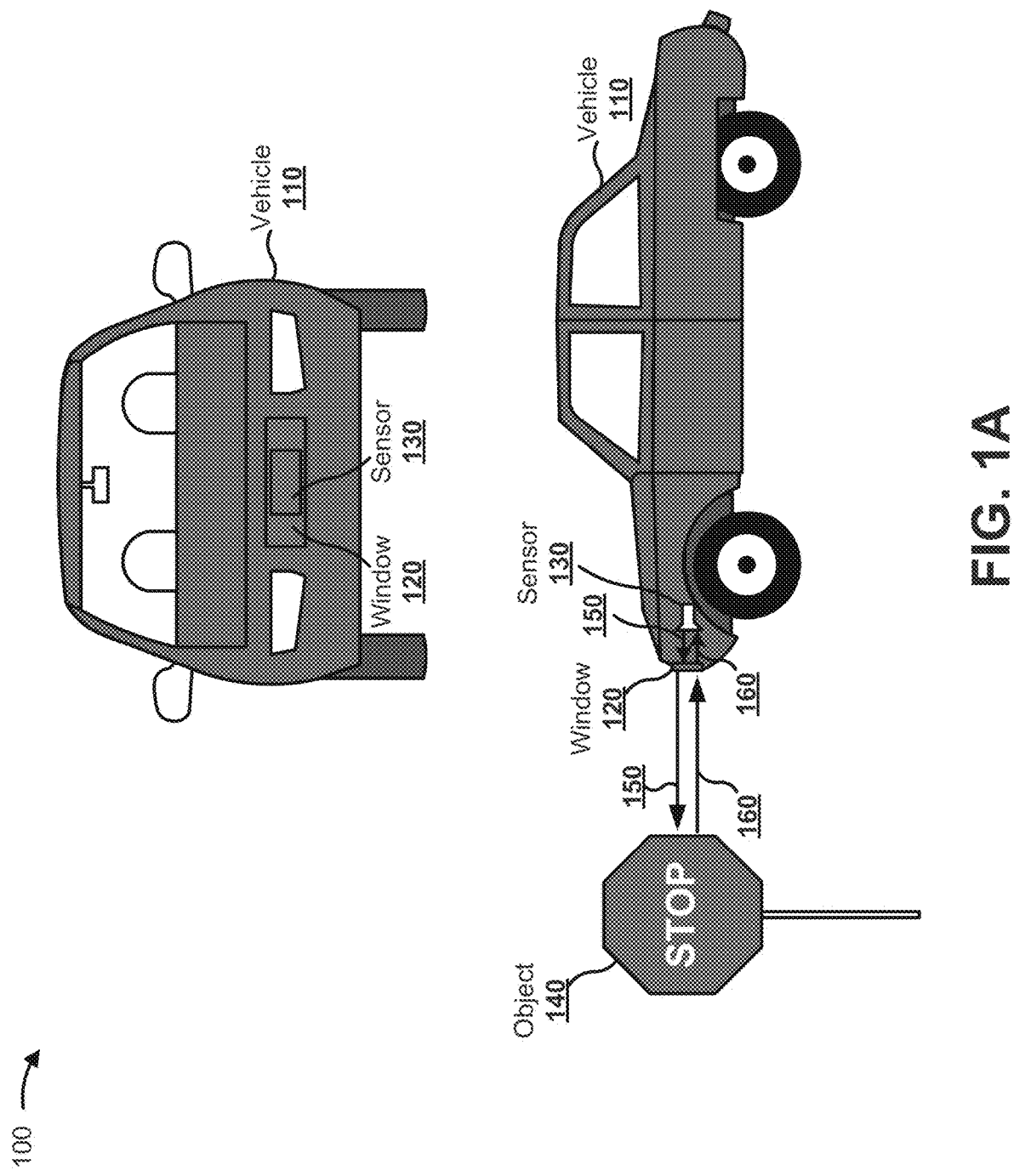
FIGS. 1A and 1B are diagrams of example implementations of a sensor window described herein.

The following detailed description of example implementations refers to the accompanying drawings. The same reference numbers in different drawings may identify the same or similar elements.

A window may be provided to separate an internal environment from an external environment and to enable light to pass through from the external environment to the internal environment, from the internal environment to the external environment, and/or the like. For example, in a vehicle context, such as for a car, a windshield window may be provided to protect a vehicle operator from environmental conditions, such as a rain condition, a wind condition, a dust condition, a debris condition, and/or the like. The windshield window may be manufactured from a material that provides durability and that enables light to pass through to enable the vehicle operator to operate the vehicle.

An optical system may be disposed behind the windshield window to protect the optical system from the external environment. For example, in a vehicle context, an object recognition sensor may be disposed behind a windshield, a headlight, and/or the like to protect the object recognition sensor. Similarly, in a security context, a facial recognition sensor may be disposed behind a window to protect the facial recognition sensor from being adjusted by unauthorized persons. However, the window may enable unauthorized persons to see the optical system. For example, an unauthorized person may see the optical system behind a window, and may cover the window, damage the window and/or the optical system, avoid a line of sight of the optical system, and/or the like, thereby reducing an effectiveness of the optical system. Similarly, a vehicle owner may forgo installing an object recognition sensor in an automobile because of a negative aesthetic impact to the automobile from the optical system being visible to other persons, thereby forgoing safety benefits from the object recognition sensor.

Some windows may be colored to reduce a visibility of a sensor system disposed behind the window. For example, in the vehicle context, tinted glass may be used to hide the object recognition sensor from view to an external person. Similarly, in the security context, a color pigment may be applied to glass to hide a facial recognition sensor disposed behind the glass. However, using pigment colored glass or tinted glass may require greater than a threshold glass thickness to achieve opaqueness, which may result in an excessive size for installation, may reduce an amount of light that is directed to an optical system or is provided by the optical system, and/or the like. Furthermore, a color pigment based colored glass may lack a sharp transition between opaqueness in visible light wavelengths and transmissivity in sensing light wavelengths (e.g., near-infrared wavelengths, mid-infrared wavelengths, and/or the like). The lack of the sharp transition may reduce a sensing capability in sensing wavelengths relatively close to visible light wavelengths, thereby reducing an effectiveness of the optical system.

Some implementations, described herein, may provide a color-matched sensor window for an optical system. For example, a sensor window may be configured, such as using alternating high refractive index material layers and low refractive index material layers, to be transmissive to sensing wavelengths and opaque to visible light wavelengths. In this way, the sensor window may be configured color-selectively to enable integration into, for example, a vehicle, a secure housing, and/or the like. Moreover, the sensor window may be associated with less than a threshold thickness and with a relatively sharp transition between transmissivity at sensing wavelengths and opaqueness at visible light wavelengths, thereby improving performance of an optical system associated with the sensor window. Furthermore, based on being color configurable, the sensor window may be color-matched to an external environment, thereby reducing a likelihood that an optical system is installed (e.g., into a vehicle, as a security feature, etc.) relative to non-color-selectively configurable sensor windows.

Figure 1B:
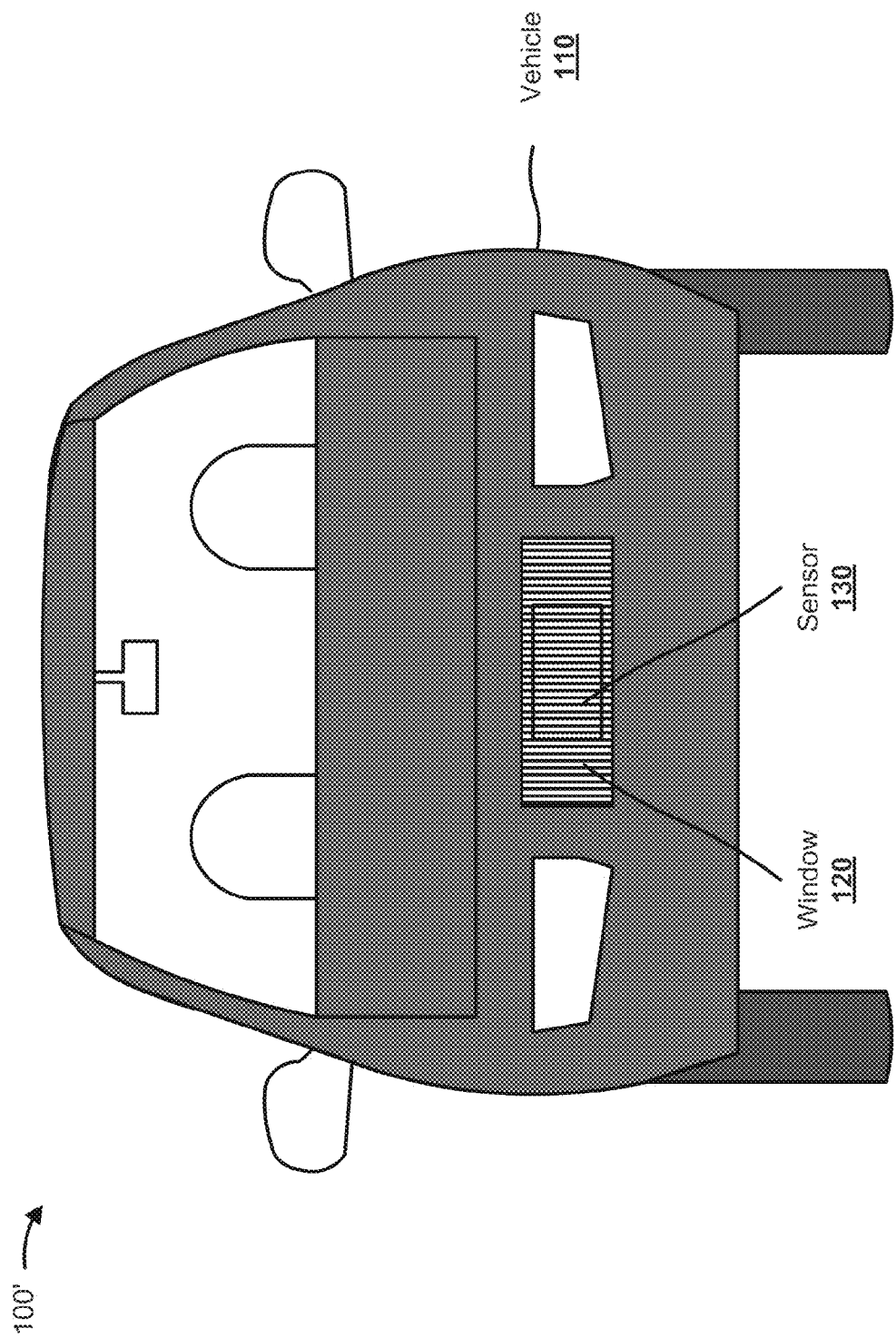

FIGS. 1A and 1B are diagrams of example implementations 100/100' described herein. As shown in FIG. 1A, example 100 may include a vehicle 110, a sensor window 120, and a sensor 130.

Although some implementations, described herein, are describe in terms of a sensing system in a vehicle deployment, other systems in other deployments are possible, such as a communications system (e.g., a Li-Fi system), a biometric system, a security system, a health monitoring system, an object identification system, a spectroscopic identification system, a LIDAR system, and/or the like in a fixed deployment, a wearable deployment, and/or the like.

As further shown in FIG. 1A, vehicle 110 may be within a threshold proximity of an object 140 (e.g., a stop sign). As shown by reference numbers 150 and 160, sensor 130 may transmit an optical signal toward object 140, and the optical signal may be reflected toward sensor 130. For example, sensor 130 may transmit a near-infrared signal, and may receive a reflected near-infrared signal based on object 140 reflecting the near-infrared signal. In this case, sensor 130 may determine a characteristic of object 140 based on the reflected near-infrared signal. For example, sensor 130 may determine a proximity of object 140, a size of object 140, a type of object of object 140, and/or the like based on the reflected near-infrared signal.

In some implementations, sensor window 120 may be associated with a particular color. For example, based on a type of layers, a thickness of layers, an order of layers, and/or the like, sensor window 120 may be configured to pass near-infrared light, to absorb a first set of colors of visible light, and to reflect a second set of colors of visible light. In this case, based on configuring the second set of colors to match a surface adjacent to sensor window 120 (e.g., based on causing sensor window 120 to reflect a shade of red matching vehicle 110), sensor window 120 may be hidden from view. Moreover, based on configuring sensor window 120 to pass near-infrared light, sensor window 120 may enable sensor 130 to transmit the near-infrared signal and receive the reflected near-infrared signal without the near-infrared light being blocked by sensor window 120. In this way, sensor window 120 enables functioning of a sensor system including sensor 130, protects sensor 130 from environment degradation, and hides sensor 130 from view, thereby improving both functioning of sensor 130 and aesthetics of vehicle 110.

As shown in FIG. 1B, and in example implementation 100', in contrast, sensor window 120 may be configured to provide a secondary visual feature. For example, rather than a color of sensor window 120 being configured to match, for example, a surface adjacent to sensor window 120, sensor window 120 may be configured to reflect a different color or colors of light. As shown, sensor window 120 may be configured to appear as black and white vertical bars, thereby causing sensor window 120 to appear to resemble a grill of vehicle 110. In another example, sensor window 120 may reflect one or more colors to resemble a vehicle's manufacturer's logo, thereby causing sensor window 120 to be camouflaged from view. In another example, sensor window 120 may be configured to have camouflaged colors, such as when sensor window 120 is deployed to cover a sensor system in a forested environment (e.g., for wildlife monitoring). In another example, sensor window 120 may be configured in an anti-camouflaging pattern, such as to cause a passerby to notice a sensor system rather than to obscure the sensor system. For example, in a security deployment, sensor window 120 may be configured to reflect one or more bright colors (e.g., alternating yellow and orange stripes) to make passersby aware of a sensor system, thereby providing an additional deterrent to theft or trespassing.

As indicated above, FIGS. 1A and 1B are provided merely as examples. Other examples are possible and may differ from what was described with regard to FIGS. 1A and 1B.

Figure 2:
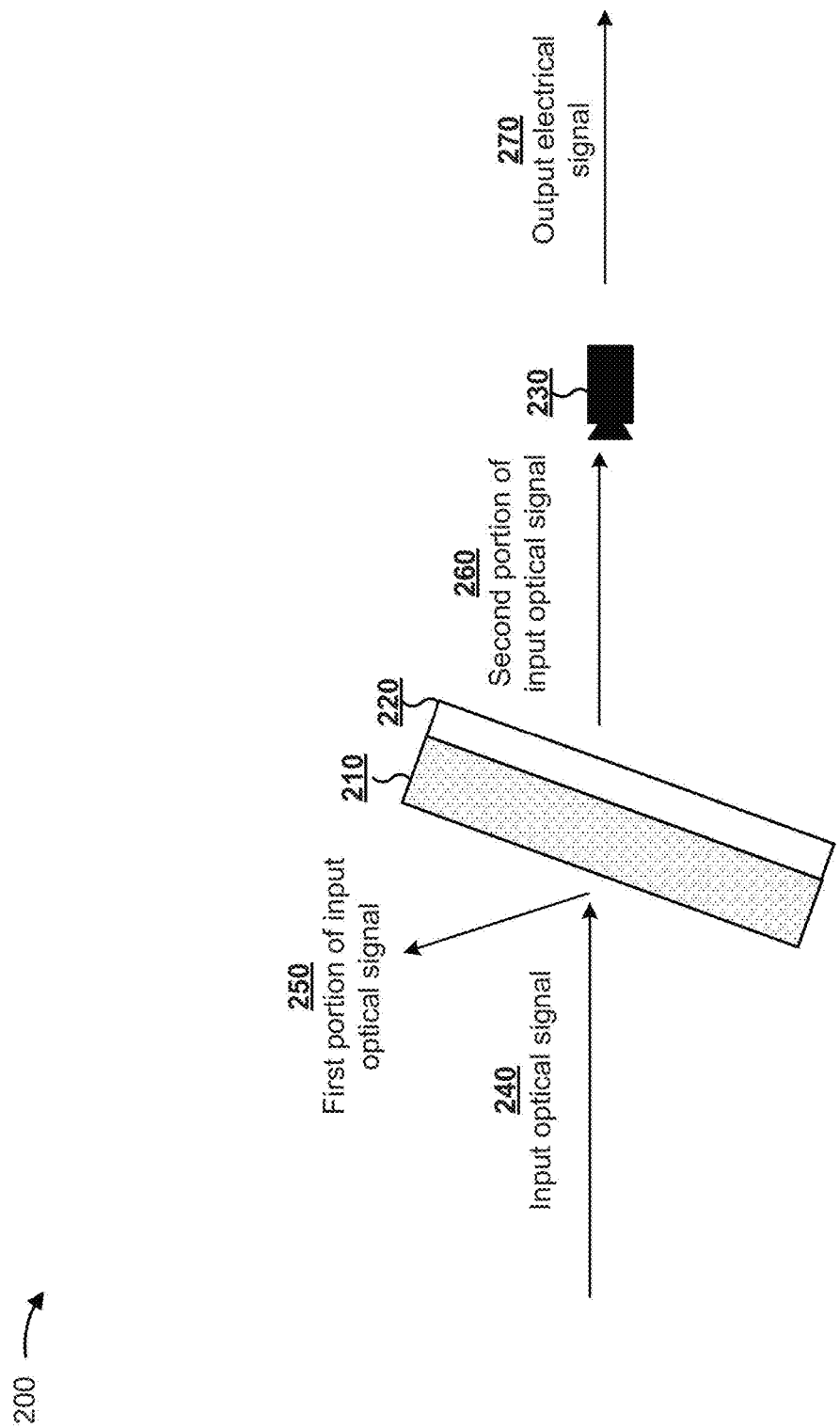
FIG. 2 is a diagram of an example implementation of an optical system that includes a sensor window described herein.

FIG. 2 is a diagram of an example implementation 200 described herein. As shown in FIG. 2, example implementation 200 includes a sensor system. The sensor system may be a portion of an optical system, and may provide an electrical output corresponding to a sensor determination. The sensor system includes a sensor window 210, which is disposed on a substrate 220, and an optical sensor 230. In some implementations, sensor window 210 may be an optical filter that performs a filtering functionality. For example, sensor window 210 may include alternating high refractive index material layers and low refractive index material layers to provide color selectivity and to direct light to multiple sensor elements of optical sensor 230 associated with multiple wavelength channels.

Although some implementations, described herein, may be described in terms of a sensor window in a sensor system, implementations described herein may be used in another type of system, may be used external to a sensor system, and/or the like.

As further shown in FIG. 2, and by reference number 240, an input optical signal is directed toward sensor window 210. The input optical signal may include but is not limited to light associated with a particular spectral range (e.g., a near-infrared spectral range, a mid-infrared spectral range, a visible spectral range, and/or the like). For example, an optical transmitter may direct the light toward optical sensor 230 to permit optical sensor 230 to perform a measurement of the light (e.g., the optical transmitter may direct the light toward an object and the light may be reflected toward optical sensor 230). In another example, the optical transmitter may direct another spectral range of light for another functionality, such as a testing functionality, a sensing functionality, a communications functionality, and/or the like.

As further shown in FIG. 2, and by reference number 250, a first portion of the input optical signal with a first spectral range is not passed through by sensor window 210. For example, dielectric filter stacks of dielectric thin film layers, which may include high index material layers and low index material layers of sensor window 210, may cause the first portion of the input optical signal to be reflected in a first direction, to be absorbed, and/or the like. In some implementations, the first portion of the input optical signal may include first light that is reflected to cause sensor window 210 to appear to a viewer as a particular color and second light that is absorbed. In some implementations, the first portion of the input optical signal may be a threshold portion of light incident on sensor window 210 not included in a bandpass of sensor window 210, such as greater than 95% of light, greater than 99% of light, and/or the like in a visible spectral range.

As further shown in FIG. 2, and by reference number 260, a second portion of the input optical signal is passed through by sensor window 210. For example, sensor window 210 may pass through the second portion of the input optical signal with a second spectral range in a second direction toward optical sensor 230. In this case, the second portion of the input optical signal may be a threshold portion of light incident on sensor window 210 within a bandpass of sensor window 210, such as greater than 50% of incident light, greater than 90% of light, greater than 95% of light, greater than 99% of light, and/or the like in a near-infrared spectral range. In some implementations, sensor window 210 may be associated with multiple component filters associated with multiple spectral ranges. For example, based on varying a thickness of sensor window 210, different portions of sensor window 210 may pass different wavelengths of light to different sensor elements of optical sensor 230, thereby enabling multispectral sensing.

As further shown in FIG. 2, and by reference number 270, based on the second portion of the input optical signal being passed to optical sensor 230, optical sensor 230 may provide an output electrical signal for the sensor system, such as for use in imaging, detecting the presence of an object, identifying a person, performing a measurement, facilitating communication, and/or the like. In some implementations, another arrangement of sensor window 210 and optical sensor 230 may be utilized. For example, rather than passing the second portion of the input optical signal collinearly with the input optical signal, sensor window 210 may direct the second portion of the input optical signal in another direction toward a differently located optical sensor 230.

As indicated above, FIG. 2 is provided merely as an example. Other examples are possible and may differ from what was described with regard to FIG. 2.

Figure 3:
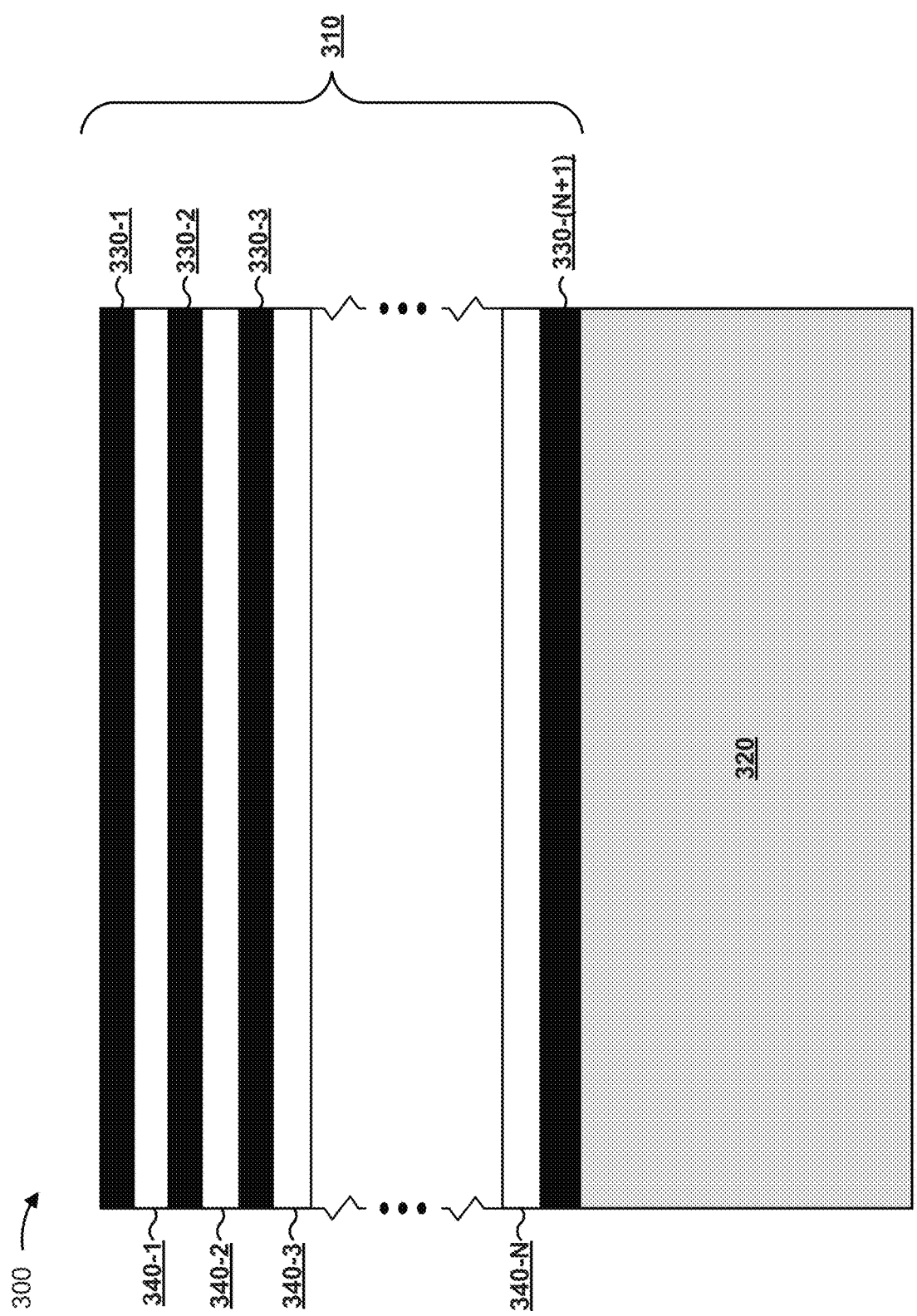
FIG. 3 is a diagram of an example implementation of a sensor window described herein.

FIG. 3 is a diagram of an example optical filter 300. FIG. 3 shows an example stackup of an optical filter that may be utilized as a sensor window described herein. As further shown in FIG. 3, optical filter 300 includes an optical filter coating portion 310 and a substrate 320.

Optical filter coating portion 310 includes a set of optical filter layers. For example, optical filter coating portion 310 includes a first set of layers 330-1 through 330-N+1 (N≥1) and a second set of layers 340-1 through 340-N. In another example, optical filter coating portion 310 may be a single type of layer (e.g., one or more layers 330), three or more types of layers (e.g., one or more layers 330, one or more layers 340, and one or more of one or more other types of layers), and/or the like. In some implementations, optical filter coating portion 310 may be disposed on a single side of substrate 320. In some implementations, optical filter coating portion 310 may be discontinuous. For example, optical filter coating portion 310 may be disposed on multiple sides of substrate 320. In this case, a first set of layers of optical filter coating portion 310 may be disposed on a top side of substrate 320 and a second set of layers of optical filter coating portion 310 may be disposed on a bottom side of substrate 320 to collectively provide a color-selectively functionality, a passband functionality, an out-of-band block functionality, an anti-reflectance coating functionality, a polarization control functionality, and/or the like. Additionally, or alternatively, optical filter coating portion 310 may include a first set of layers and a second set of layers separated by and sandwiching one or more intermediate layers.

In some implementations, layers 330 may include a set of layers of a high refractive index material (H layers), such as silicon layers, hydrogenated silicon layers, silicon-germanium (SiGe) layers, germanium layers, hydrogenated germanium layers, hydrogenated silicon-germanium layers, and/or the like. In some implementations, layers 330 may be associated with a refractive index of greater than approximately 3.0, greater than approximately 3.5, greater than approximately 3.6, greater than approximately 3.8, greater than approximately 4.0, and/or the like. Although some layers may be described as a particular material, such as SiGe, some layers may include (small quantities of) phosphor, boron, nitride, hydrogen, a noble gas, and/or the like.

In some implementations, layers 330 may include a set of layers of a metal or metal alloy material. For example, layers 330 may be silver layers. Additionally, or alternatively, layers 330 may be silver alloy layers. For example, a silver alloy may be used that includes approximately 0.5 wt % gold, approximately 0.5 wt % tin, and/or the like to provide improved corrosion resistance relative to other materials. In some implementations, layers 330 may be aluminum layers.

In some implementations, layers 330 may include gold layers, platinum layers, palladium layers, alloy layers thereof, and/or the like. In some implementations, layers 330 may have different thicknesses. For example, a first metal layer may have a first thickness and a second metal layer may have a second thickness. In this case, the metal layers each may have a physical thickness of between approximately 5 nanometers (nm) and approximately 50 nm, of between approximately 10 nm and approximately 35 nm, and/or the like.

In some implementations, layers 340 may include a set of layers of a low refractive index material (L layers), such as silicon dioxide layers and/or the like. Additionally, or alternatively, the L layers may include tantalum pentoxide ($Ta_2O_5$) layers, magnesium fluoride ($MgF_2$) layers, niobium pentoxide ($Nb_2O_5$) layers, titanium dioxide ($TiO_2$) layers, aluminum oxide ($Al_2O_3$) layers, zirconium oxide ($ZrO_2$) layers, yttrium oxide ($Y_2O_3$) layers, silicon nitride ($Si_3N_4$) layers, a combination thereof, and/or the like. In some implementations, layer 340 may be associated with a refractive index of less than approximately 2.7, less than approximately 2.0, less than approximately 1.5, and/or the like. In some aspects, a difference between a first refractive index of layers 330 and a second refractive index of layers 340 may be greater than approximately 1.5, greater than approximately 2.0, greater than approximately 2.5, greater than approximately 3.0, greater than approximately 3.5, and/or the like. In some implementations, optical filter coating portion 310 may include layers 330 of a first material and layers 340 of a second material.

In some implementations, optical filter coating portion 310 may include layers 330 of multiple materials and/or layers 340 of multiple materials. For example, optical filter coating portion 310 may include a first type of layer 330 with a first refractive index, a second type of layer 330 with a second refractive index, and a layer 340 with a third refractive index. Similarly, optical filter coating portion 310 may include a layer 330 with a first refractive index, a first type of layer 340 with a second refractive index, and a second type of layer 340 with a third refractive index. Similarly, optical filter coating portion 310 may include multiple types of layers 330 with multiple refractive indices and multiple types of layers 340 with multiple refractive indices. Based on using a third type of material, a fourth type of material, and/or the like, a color, a passband, a filtering functionality, and/or the like may be tuned to a higher degree of configurability (e.g., a more granular color configurability, passband configurability, and/or the like) relative to using a single material for layers 330 and a single material for layers 340.

In some implementations, optical filter coating portion 310 may be associated with a particular quantity of layers, m. For example, an optical filter for use as a sensor window may include a quantity of alternating high refractive index layers and low refractive index layers, such as a range of 2 layers to 200 layers. In some implementations, optical filter coating portion 310 may be fabricated using a sputtering procedure. For example, optical filter coating portion 310 may be fabricated using a pulsed-magnetron based sputtering procedure to sputter alternating layers 330 and 340 on a glass substrate or another type of substrate, as described herein. In some implementations, multiple cathodes may be used for the sputtering procedure, such as a first cathode to sputter silicon and a second cathode to sputter germanium or a mix of germanium and silicon, thereby forming a silicon-germanium layer. In some implementations, optical filter coating portion 310 may include one or more other types of layers to provide one or more other functionalities, such as a hydrophobic layer (e.g., on an outer surface of a sensor window to avoid water, such as rain, covering a sensor window), a hydrophilic layer or a superhydrophilic layer (e.g., on an inner surface of a sensor window to avoid fogging of the sensor window, to add a self-cleaning functionality to the sensor window, etc.), an oleophobic layer, a protective layer (e.g., a coating disposed on top of optical filter coating portion 310), an anti-reflectance layer, a heat generating layer (e.g., a layer of material with embedded electrical connections to enable heating of optical filter 300), an anti-icing layer, an out of band blocker layer (e.g., to block a particular spectral range), and/or the like. In some implementations, substrate 320 may be chemically strengthened glass to provide protection to one or more sensor elements covered by substrate 320. In some implementations, optical filter 300 and/or one or more layers thereof may be laminated (e.g., covered with a laminated coating or formed in a laminated construction) to provide shatter resistance to optical filter 300, thereby providing protection to one or more sensor elements covered by optical filter 300.

In some implementations, optical filter coating portion 310 may be annealed using one or more annealing procedures, such as a first annealing procedure at a temperature of approximately 280 degrees Celsius or between approximately 200 degrees Celsius and approximately 400 degrees Celsius, a second annealing procedure at a temperature of approximately 320 degrees Celsius or between approximately 250 degrees Celsius and approximately 350 degrees Celsius, and/or the like.

In some implementations, each layer of optical filter coating portion 310 may be associated with a particular thickness. For example, layers 330 and 340 may each be associated with a thickness of between 1 nm and 1500 nm, between 10 nm and 500 nm, and/or the like. Additionally, or alternatively, optical filter 300 may be associated with a thickness of between 50 μm and 10 millimeters (mm), between 1 mm and 5 mm, and/or the like. In some implementations, at least one of layers 330 and 340 may each be associated with a thickness of less than 1000 nm, less than 100 nm, or less than 5 nm, and/or the like. Additionally, or alternatively, optical filter coating portion 310 may be associated with a thickness of less than 100 μm, less than 50 μm, less than 10 μm, less than 5 μm, and/or the like. In some implementations, a layer may be associated with multiple different thicknesses. For example, to form a set of channels, a thickness of a particular layer (e.g., a spacer layer disposed between a set of reflectors formed by layers 330 and layers 340) may be varied to cause different wavelengths of light to be directed to different sensor elements of a sensor element array via different channels. In this way, a sensor window may enable use of a multispectral sensor to determine information regarding multiple wavelengths of light. In some implementations, optical filter 300 may form at least 1 channel, at least 2 channels, at least 32 channels, at least 64 channels, at least 128 channels, and/or the like to enable sensing of a threshold quantity of wavelengths. In some implementations, multiple channels may be associated with a common wavelength for sensing by at least one sensor element aligned to the multiple channels.

In some implementations, optical filter 300 may be associated with a particular spectral range, such as a near-infrared spectral range, a mid-infrared spectral range, and/or the like. For example, optical filter 300 may be associated with a spectral range from approximately 600 nm to approximately 2500 nm, from approximately 700 nm to approximately 2000 nm, from approximately 800 nm to approximately 1600 nm, and/or the like. In some implementations, optical filter 300 may be associated with a particular center wavelength, such as a center wavelength of approximately 940 nm, a center wavelength of approximately 1064 nm, a center wavelength of approximately 1550 nm, and/or the like. In some implementations, optical filter 300 may be associated with a particular channel separation, such as a channel separation of less than approximately 50 nm, less than approximately 20 nm, less than approximately 10 nm, less than approximately 5 nm, less than approximately 1 nm, and/or the like.

In some implementations, optical filter 300 may be associated with a particular color shift. For example, optical filter 300 may be associated with a color shift from a first color at a first angle of incidence (e.g., 0 degrees) to a second color at a second angle of incidence (e.g., greater than 15 degrees, 30 degrees, 45 degrees, 60 degrees, and/or the like) of within 1 ΔE, within 5 ΔE, within 10 ΔE, within 20 ΔE, within 30 ΔE, within 40 ΔE, within 100 ΔE, within 150 ΔE, and/or the like. In some implementations, optical filter 300 may be associated with a threshold transmissivity, such as greater than approximately 50% transmissivity, greater than approximately 80% transmissivity, greater than approximately 90% transmissivity, greater than approximately 95% transmissivity, greater than approximately 99% transmissivity, and/or the like a particular spectral range (e.g., a sensing spectral range). In some implementations, optical filter 300 may be associated with a threshold opacity (e.g., based on reflectance, absorption, and/or the like). For example, optical filter 300 may be associated with an opacity of greater than approximately 50% transmissivity, greater than approximately 80% transmissivity, greater than approximately 90% transmissivity, greater than approximately 95% transmissivity, greater than approximately 99% transmissivity, and/or the like a particular spectral range (e.g., a visible spectral range). In this way, optical filter 300 enables color-selectivity for a sensor window and enables sensing by a sensor element disposed in an optical path of the sensor window.

In some implementations, optical filter 300 may be associated with multiple characteristics at multiple locations of optical filter 300. For example, a first portion of optical filter 300 may be associated with a first thickness, a first arrangement of layers, a first type of material, and/or the like at a first cross-sectional region of optical filter 300 and a second portion of optical filter 300 may be associated with a second thickness, a second arrangement of layers, a second type of material, and/or the like at a second cross-sectional region of optical filter 300. In this way, optical filter 300 may enable color-selectivity for multiple colors in a single sensor window, such as to form a particular pattern, to form a particular iconography, and/or the like, as described above.

As indicated above, FIG. 3 is provided merely as an example. Other examples are possible and may differ from what was described with regard to FIG. 3.

FIGS. 4A-4E are diagrams of example characteristics relating to a sensor window described herein.

Figure 4A:
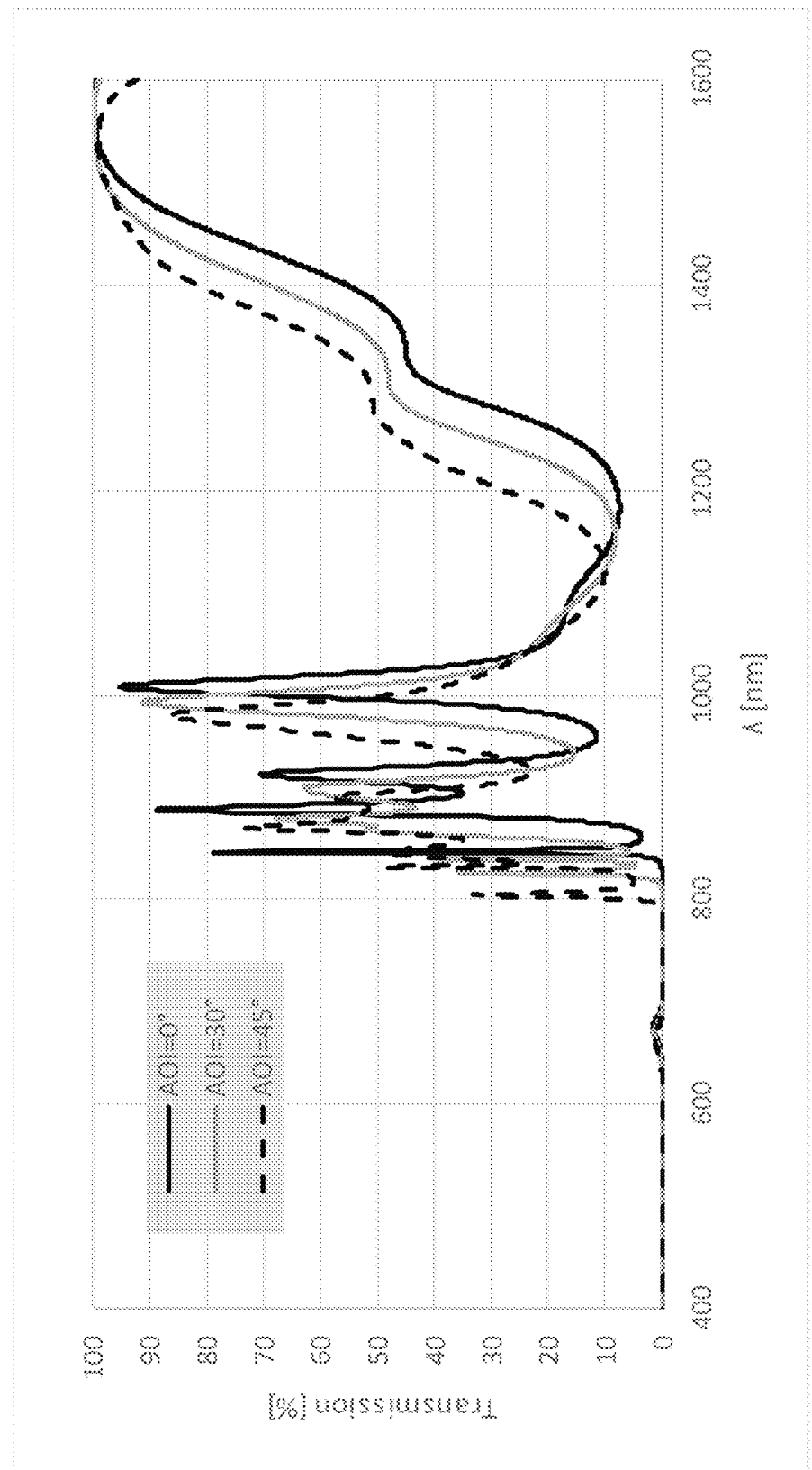

As shown in FIG. 4A, and by chart 400, a transmissivity may be determined for a sensor window and a particular spectral range. In this case, the sensor window may be a black-colored anti-reflectance sensor window disposed on a borosilicate substrate, matched to an air environment, and exposed to collimated light. Moreover, the sensor window is configured for a spectral range centered at 1550 nm. As shown, at an angle of incidence from approximately 0 degrees to approximately 45 degrees, the transmissivity is less than 5% between approximately 400 nm and approximately 780 nm and is greater than 95% at approximately 1550 nm. In this case, a blocker may be added to an optical filter that includes the sensor window to block transmission at, for example, less than approximately 1000 nm. As further shown, as a result of the transmissivity and reflectance, shown in FIG. 4B, a surface with the sensor window may appear a particular color in a visible spectral range and may provide anti-reflectance at a desired NIR spectral range at which sensing is to be performed.

Figure 4B:
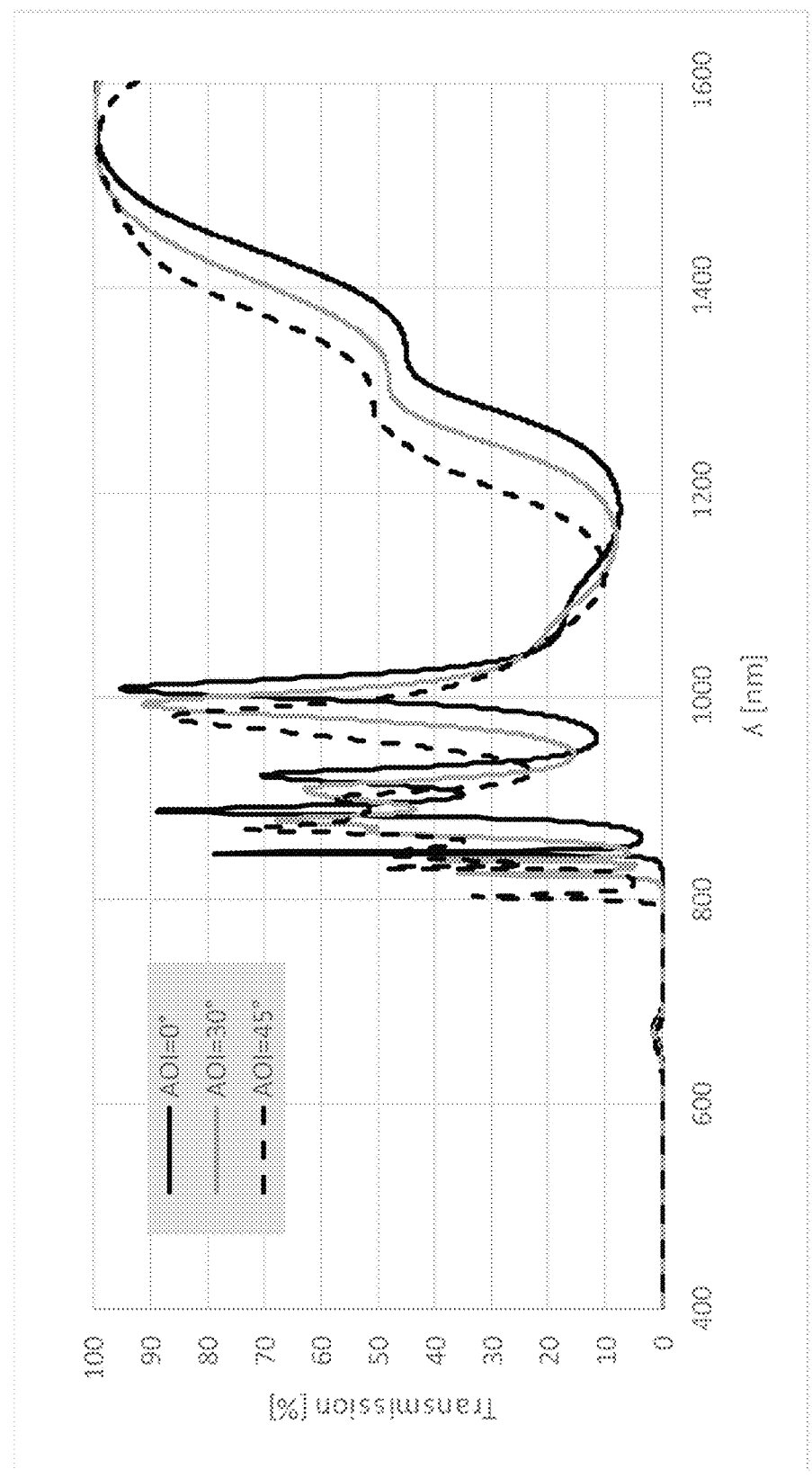

As shown in FIG. 4B, and by chart 410, a reflectance may be determined for the sensor window. In this case, reflectance may be less than 10% in the visible spectral range (e.g., approximately 390 nm to approximately 700 nm) and at angles of incidence from approximately 0 degrees to approximately 45 degrees resulting in a black color for the sensor window across a threshold range of angles of incidence (e.g., from approximately 0 degrees to at least approximately 45 degrees).

Figure 4C:
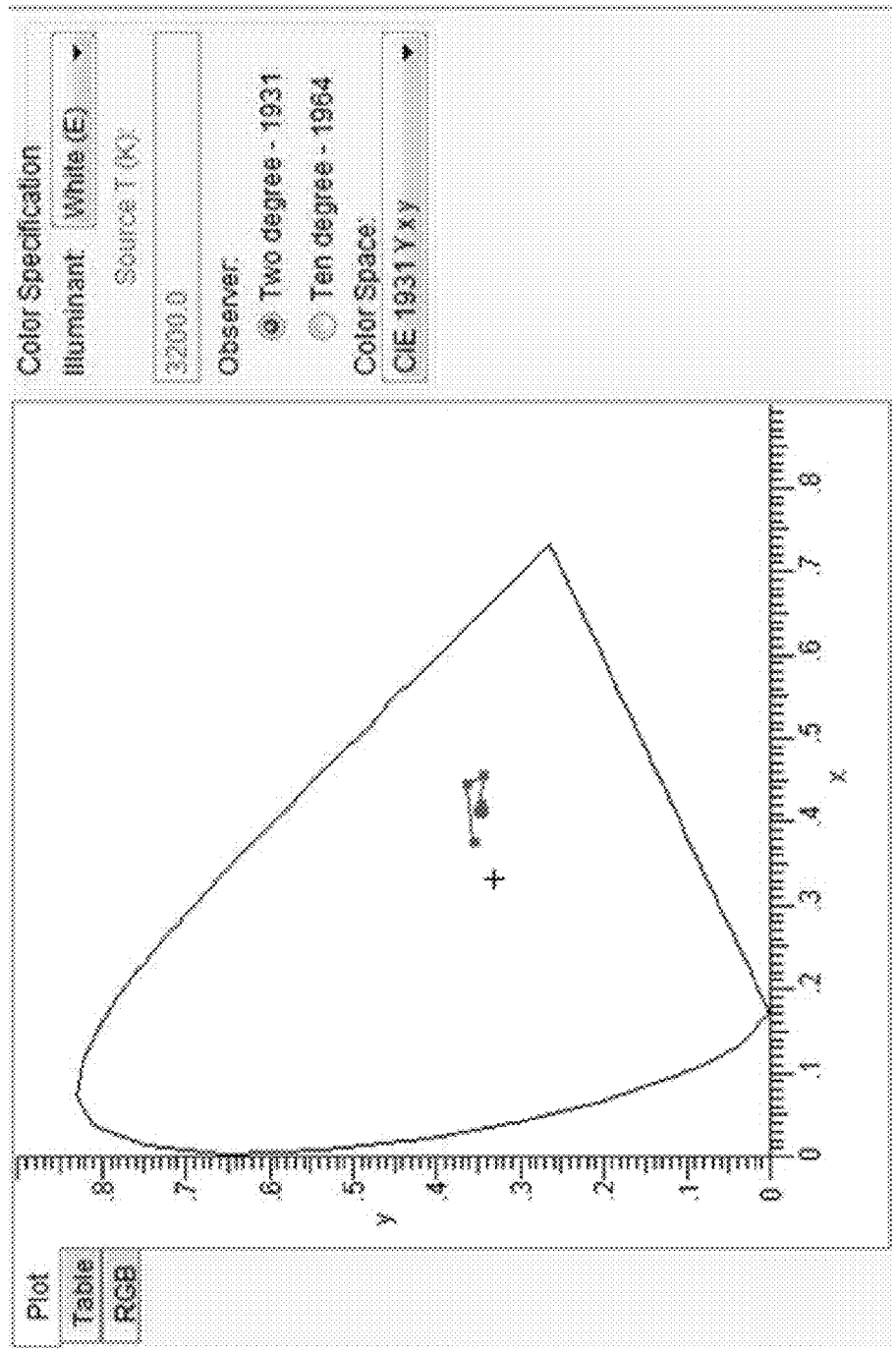
Figure 4D:
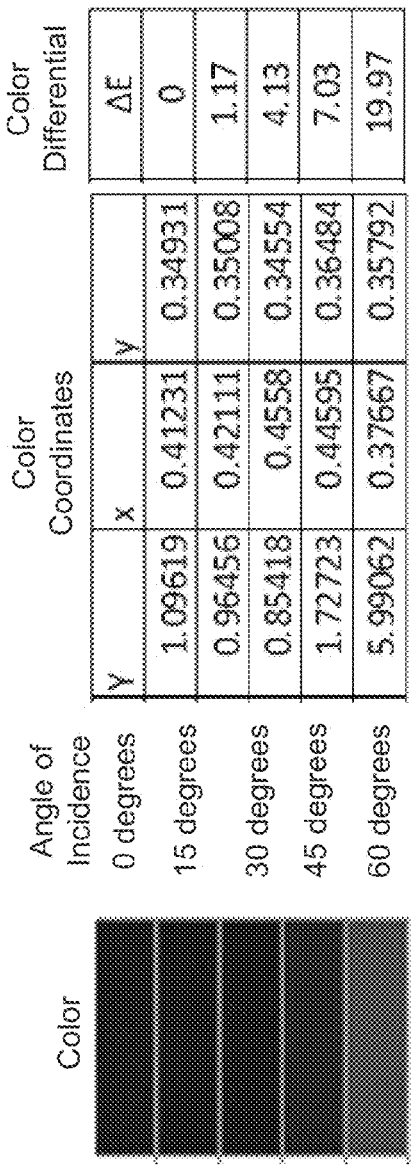

As shown in FIGS. 4C and 4D, and by charts 420 and 430, respectively, a color shift at angles of incidence from approximately 0 degrees to approximately 60 degrees is determined. For example, the sensor window is associated with a color shift, at angles of incidence from approximately 0 degrees to approximately 60 degrees, of less than approximately 20 ΔE, at angles of incidence from approximately 0 degrees to approximately 30 degrees of less than 5 ΔE, and/or the like.

As shown in FIG. 4E, and by chart 440, an example stackup is shown for the sensor window. For example, a first side of the sensor window (e.g., disposed on a first side of a substrate of the sensor window) may include alternating high refractive index layers (H layers) and low refractive index layers (L layers) matched to an air interface. A second side of the sensor window (e.g., disposed on a second side of the substrate of the sensor window) may include additional H layers and L layers. In this case, each layer may be associated with a configured thickness to provide optical performance described with regard to FIGS. 4A-4D.

In this case, as shown in FIGS. 4A-4E, the sensor window enables transmission at near-infrared wavelengths and color-selectivity at visible wavelengths for a threshold range of angles of incidence, thereby improving performance relative to other techniques for manufacturing a colored window. Moreover, based on a reduced thickness and sharper transition zone (e.g., a wavelength range from less than a first threshold transmissivity and greater than a first threshold reflectivity to greater than a second threshold transmissivity and less than a second threshold reflectivity is less than a threshold wavelength range), optical performance of a colored window and/or a sensor associated therewith is improved.

As indicated above, FIGS. 4A-4E are provided merely as examples. Other examples are possible and may differ from what was described with regard to FIGS. 4A-4E.

FIGS. 5A-5D are diagrams of example characteristics relating to a sensor window described herein.

Figure 5A:
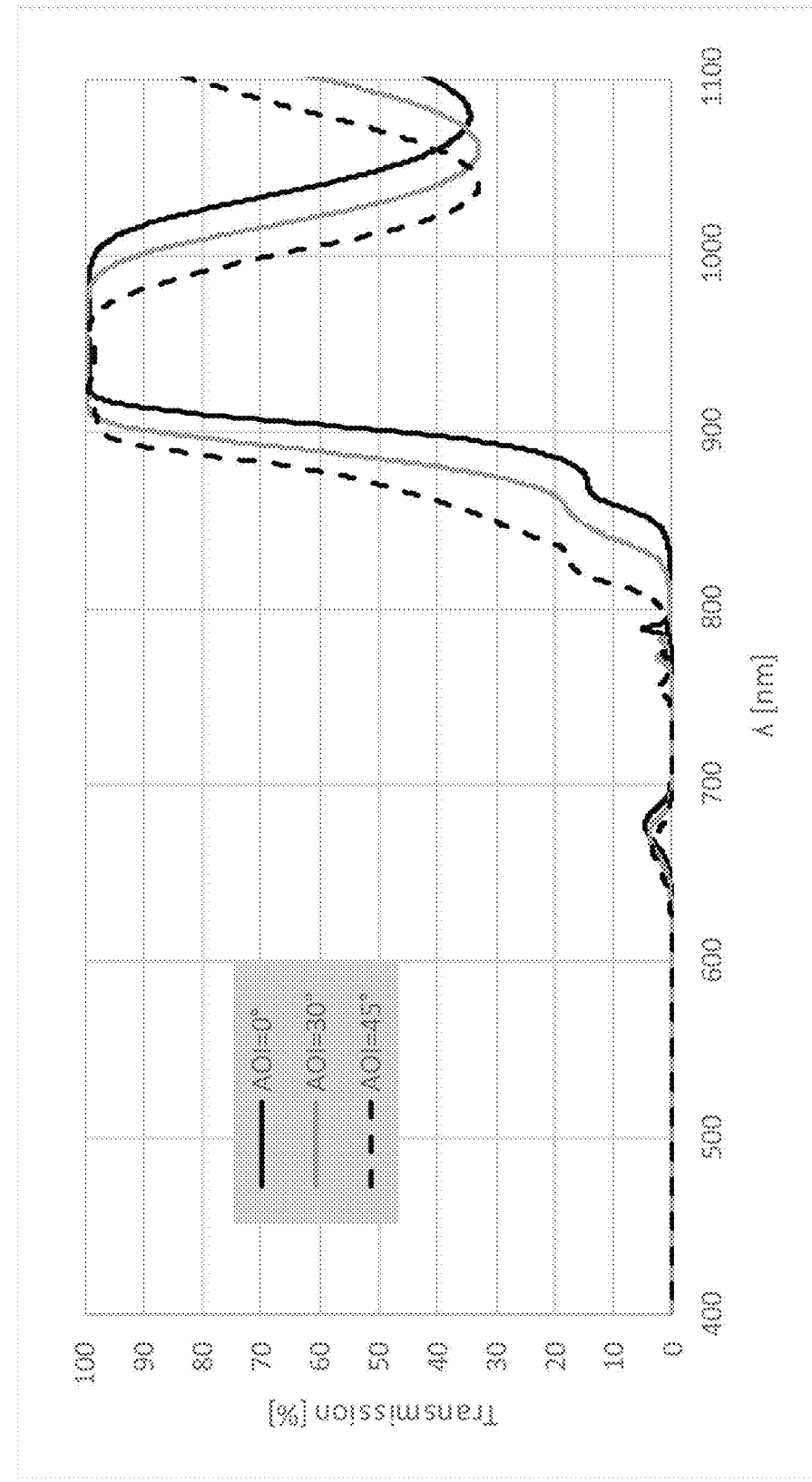

As shown in FIG. 5A, and by chart 500, a transmissivity may be determined for a sensor window and a particular spectral range. In this case, the sensor window may be a black-colored anti-reflectance sensor window disposed on a borosilicate substrate, matched to an air environment, and exposed to collimated light. Moreover, the sensor window is configured for a spectral range centered at 940 nm. As shown, at angles of incidence from approximately 0 degrees to approximately 45 degrees, the transmissivity is less than 50% between approximately 400 nm and approximately 850 nm and is greater than 95% at approximately 940 nm. In this case, a blocker may be added to an optical filter that includes the sensor window to block transmission at, for example, greater than approximately 1000 nm, thereby suppressing transmission at wavelengths greater than approximately 1000 nm.

Figure 5B:
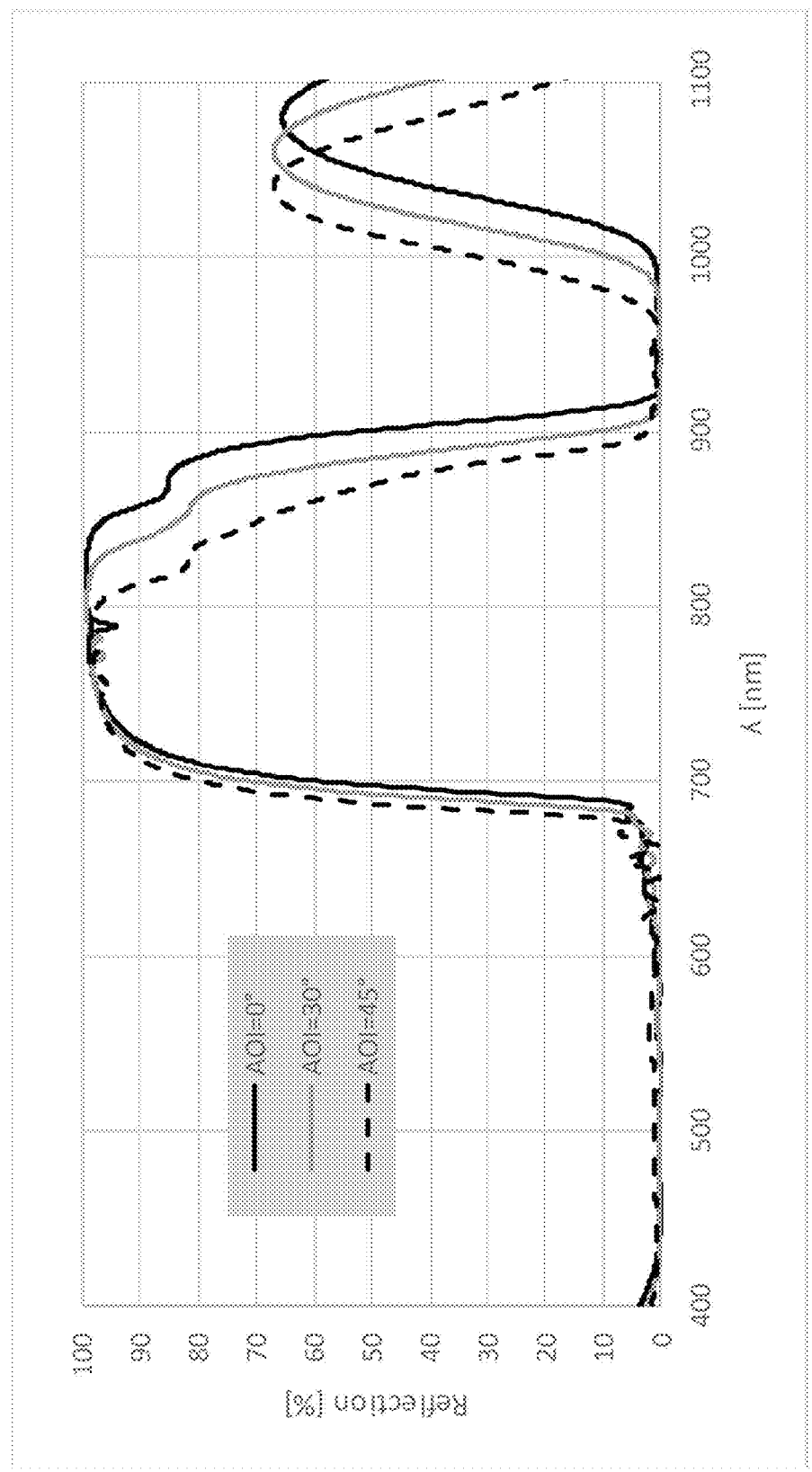

As shown in FIG. 5B, and by chart 510, a reflectance may be determined for the sensor window. In this case, the reflectance may be less than 10% in the visible spectral range (e.g., from approximately 390 nm to approximately 650 nm) and at angles of incidence from approximately 0 degrees to approximately 45 degrees, resulting in a black color for the sensor window across the angles of incidence.

Figure 5C:
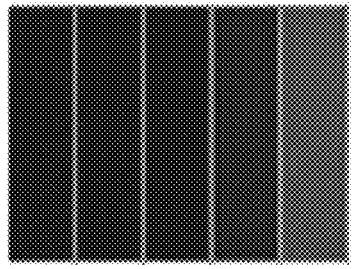

As shown in FIG. 5C, and by chart 520, a color shift at angles of incidence from approximately 0 degrees to approximately 60 degrees is determined. For example, the sensor window is associated with a color shift, at angles of incidence from approximately 0 degrees to approximately 60 degrees, of approximately 30 ΔE, at angles of incidence from approximately 0 degrees to approximately 30 degrees of less than 5 ΔE, and/or the like. In this way, as shown in FIGS. 5A-5C, the sensor window enables transmission at near-infrared wavelengths and color-selectivity at visible wavelengths for a threshold range of angles of incidence, thereby improving performance relative to other techniques for manufacturing a sensor window.

As shown in FIG. 5D, and by chart 530, an example stackup is shown for the sensor window. For example, a first side of the sensor window (e.g., disposed on a first side of a substrate of the sensor window) may include alternating high refractive index layers (H layers) and low refractive index layers (L layers) matched to an air interface. A second side of the sensor window (e.g., disposed on a second side of the substrate of the sensor window) may include additional H layers and L layers. In this case, each layer may be associated with a configured thickness to provide optical performance described with regard to FIGS. 5A-5C.

As indicated above, FIGS. 5A-5D are provided merely as examples. Other examples are possible and may differ from what was described with regard to FIGS. 5A-5D.

FIGS. 6A-6D are diagrams of example characteristics relating to a sensor window described herein.

Figure 6A:
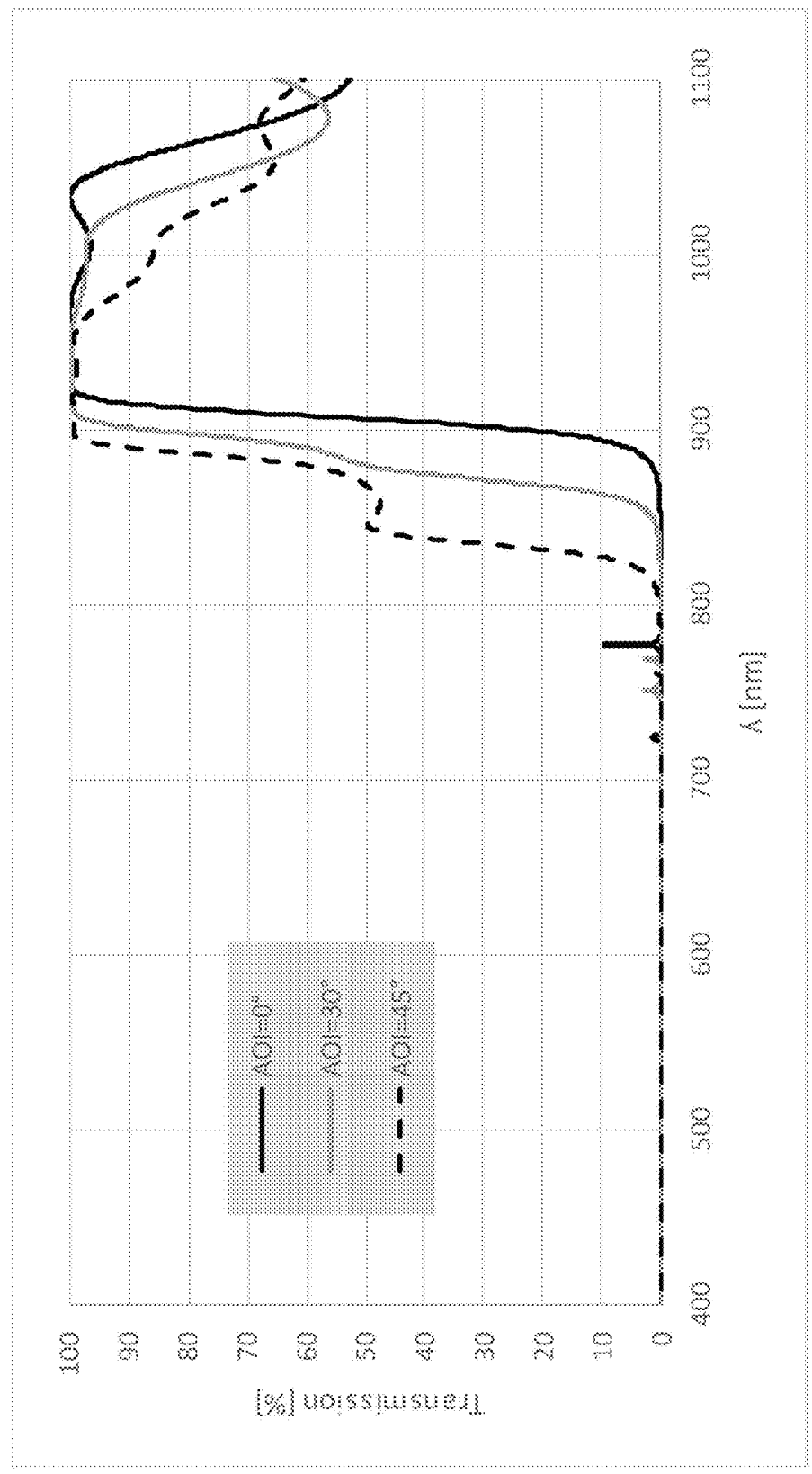
FIGS. 6A-6D are diagrams of an example of characteristics of a sensor window described herein.

As shown in FIG. 6A, and by chart 600, a transmissivity may be determined for a sensor window and a particular spectral range. In this case, the sensor window may be a red-colored anti-reflectance sensor window disposed on a borosilicate substrate, matched to an air environment, and exposed to collimated light. Moreover, the sensor window may be configured for a spectral range centered at 940 nm. As shown, at angles of incidence from approximately 0 degrees to approximately 45 degrees, the transmissivity is less than 50% between approximately 400 nm and approximately 800 nm and is greater than 85% at approximately 940 nm.

Figure 6B:
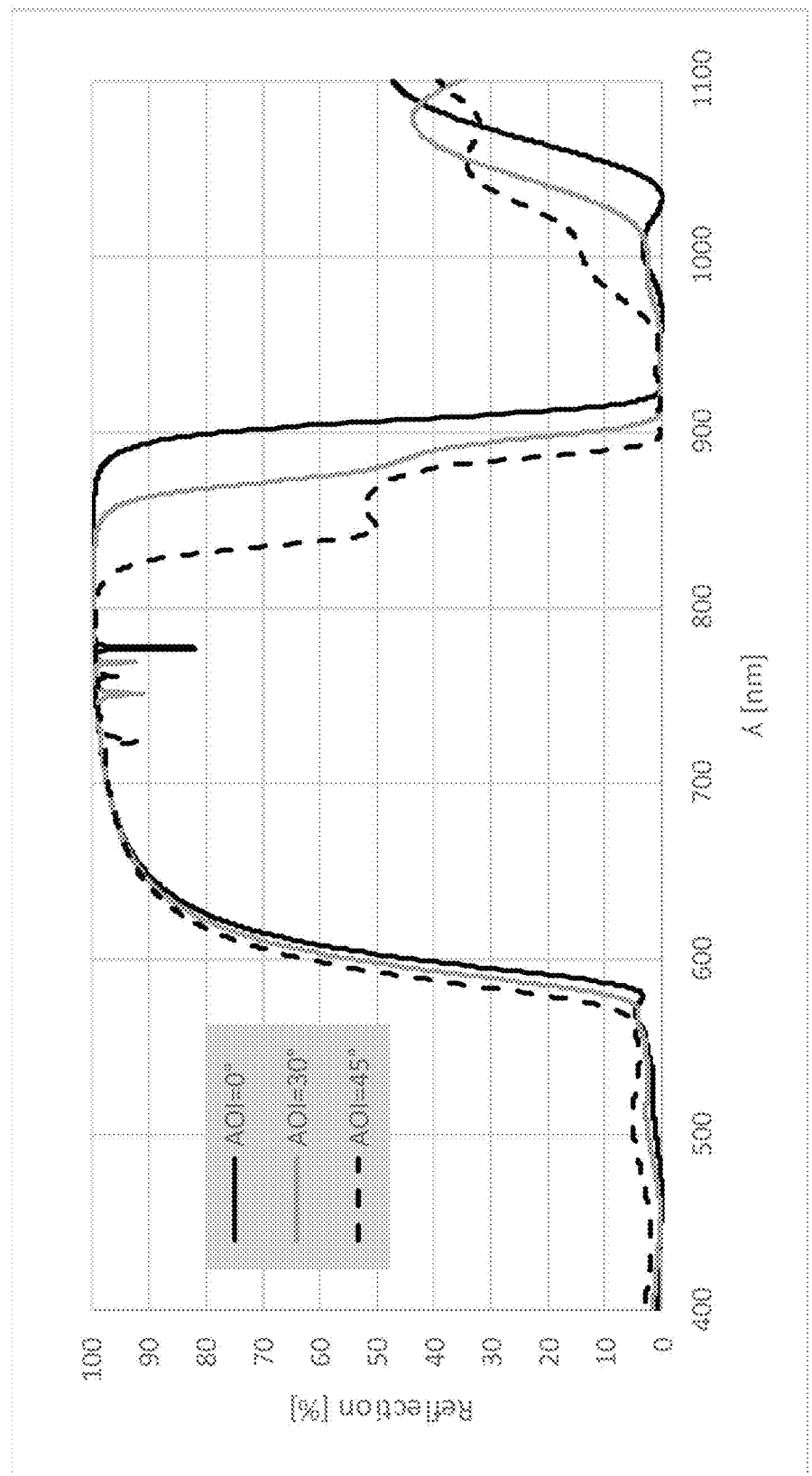

As shown in FIG. 6B, and by chart 610, a reflectance may be determined for the sensor window. In this case, the reflectance may be less than 12% at a part of the visible spectral range (e.g., approximately 390 nm to approximately 590 nm) and at angles of incidence from approximately 0 degrees to approximately 45 degrees. In contrast, the reflectance may be greater than 12% at another part of the visible spectral range (e.g., approximately 590 nm to approximately 700 nm), resulting in a red color for the sensor window.

Figure 6C:
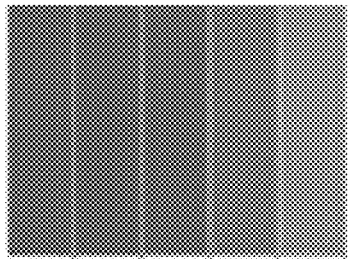

As shown in FIG. 6C, and by chart 620, a color shift at angles of incidence from approximately 0 degrees to approximately 60 degrees may be determined. For example, the sensor window is associated with a color shift, at angles of incidence from approximately 0 degrees to approximately 60 degrees, of 40 ΔE, at angles of incidence from approximately 0 degrees to approximately 30 degrees of less than 5 ΔE, and/or the like. In this way, as shown in FIGS. 6A-6C, the sensor window enables transmission at near-infrared wavelengths and color-selectivity selectivity at visible wavelengths at a threshold range of angles of incidence, thereby improving performance relative to other techniques for manufacturing a sensor window.

Figure 6D:

As shown in FIG. 6D, and by chart 630, an example stackup is shown for the sensor window. For example, a first side of the sensor window (e.g., disposed on a first side of a substrate of the sensor window) may include alternating high refractive index layers (H layers) and low refractive index layers (L layers) matched to an air interface. A second side of the sensor window (e.g., disposed on a second side of the substrate of the sensor window) may include additional H layers and L layers. In this case, each layer may be associated with a configured thickness to provide optical performance described with regard to FIGS. 6A-6C.

As indicated above, FIGS. 6A-6D are provided merely as examples. Other examples are possible and may differ from what was described with regard to FIGS. 6A-6D.

Figure 7A:
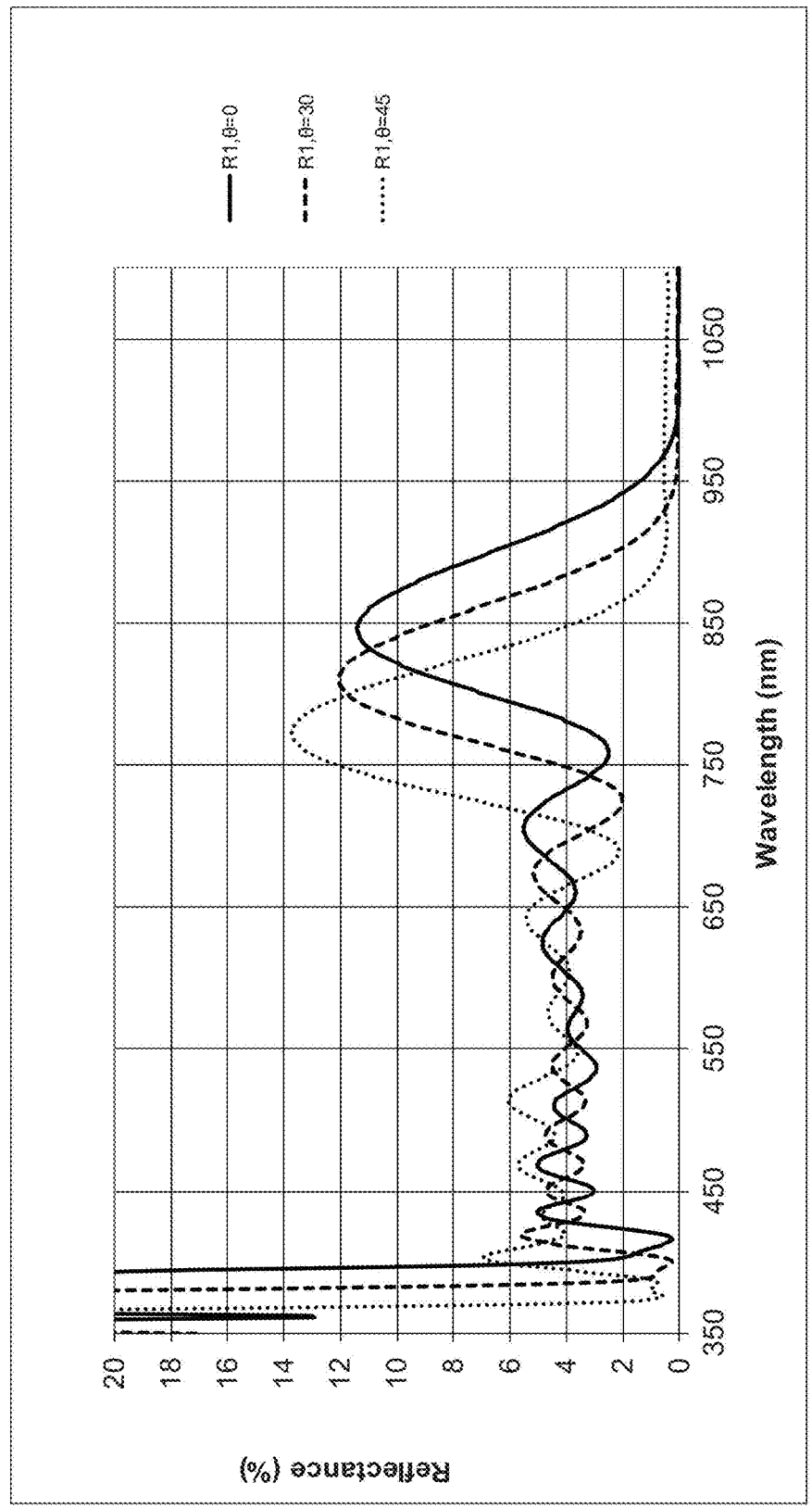
FIGS. 7A-7C are diagrams of an example of characteristics of a sensor window described herein.
Figure 7B:
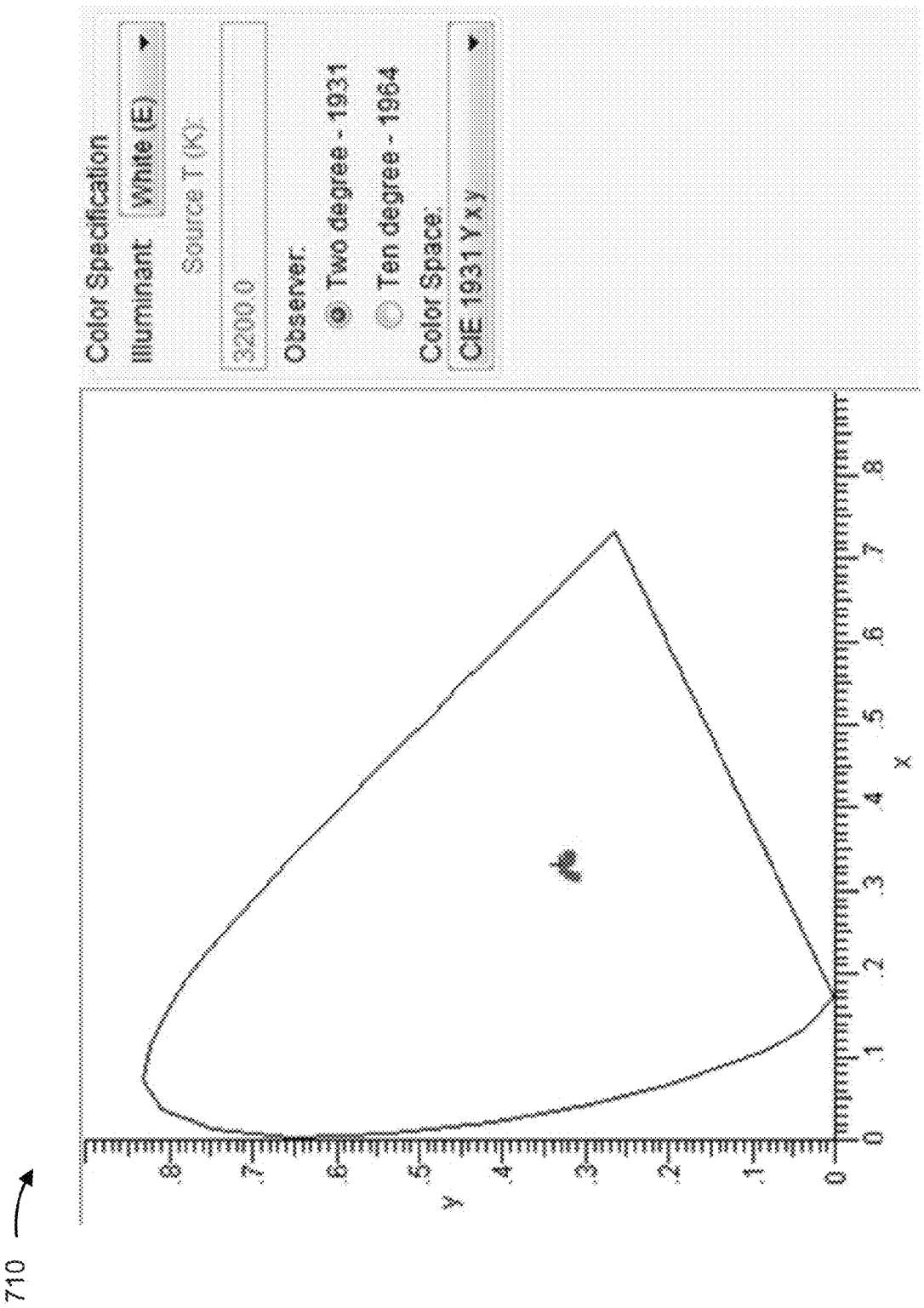
Figure 7C:
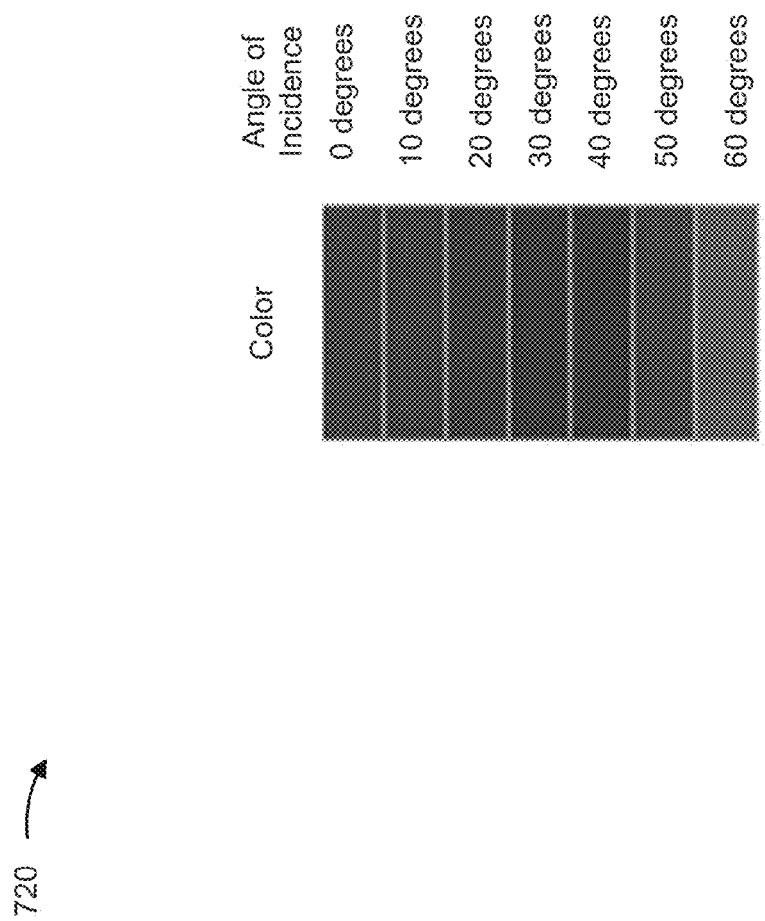

FIGS. 7A-7C are diagrams of example characteristics relating to a sensor window described herein.

As shown in FIG. 7A, and by chart 700, a reflectance may be determined for a sensor window and a particular spectral range. In this case, the sensor window may be a black-colored anti-reflectance sensor window disposed on a borosilicate substrate, matched to an air environment, and exposed to collimated light. Moreover, the sensor window may be configured for a spectral range centered at 1064 nm. In this case, reflectance may be less than 8% in the visible spectral range (e.g., approximately 390 nm to approximately 700 nm) and at angles of incidence from approximately 0 degrees to approximately 45 degrees, resulting in a black color for the sensor window.

As shown in FIGS. 7B and 7C, and by charts 710 and 720, respectively, a color shift at angles of incidence from approximately 0 degrees to approximately 60 degrees may be determined. For example, the sensor window is associated with a reduced color shift, at angles of incidence from approximately 0 degrees to approximately 60 degrees relative to other techniques for manufacturing a sensor window. In this way, as shown in FIGS. 7A-7C, the sensor window enables transmission at near-infrared wavelengths and color-selectivity at visible wavelengths at a threshold range of angles of incidence, thereby improving performance relative to other techniques for manufacturing a sensor window.

As indicated above, FIGS. 7A-7C are provided merely as examples. Other examples are possible and may differ from what was described with regard to FIGS. 7A-7C.

FIGS. 8A-8E are diagrams of example characteristics relating to a sensor window described herein.

Figure 8A:
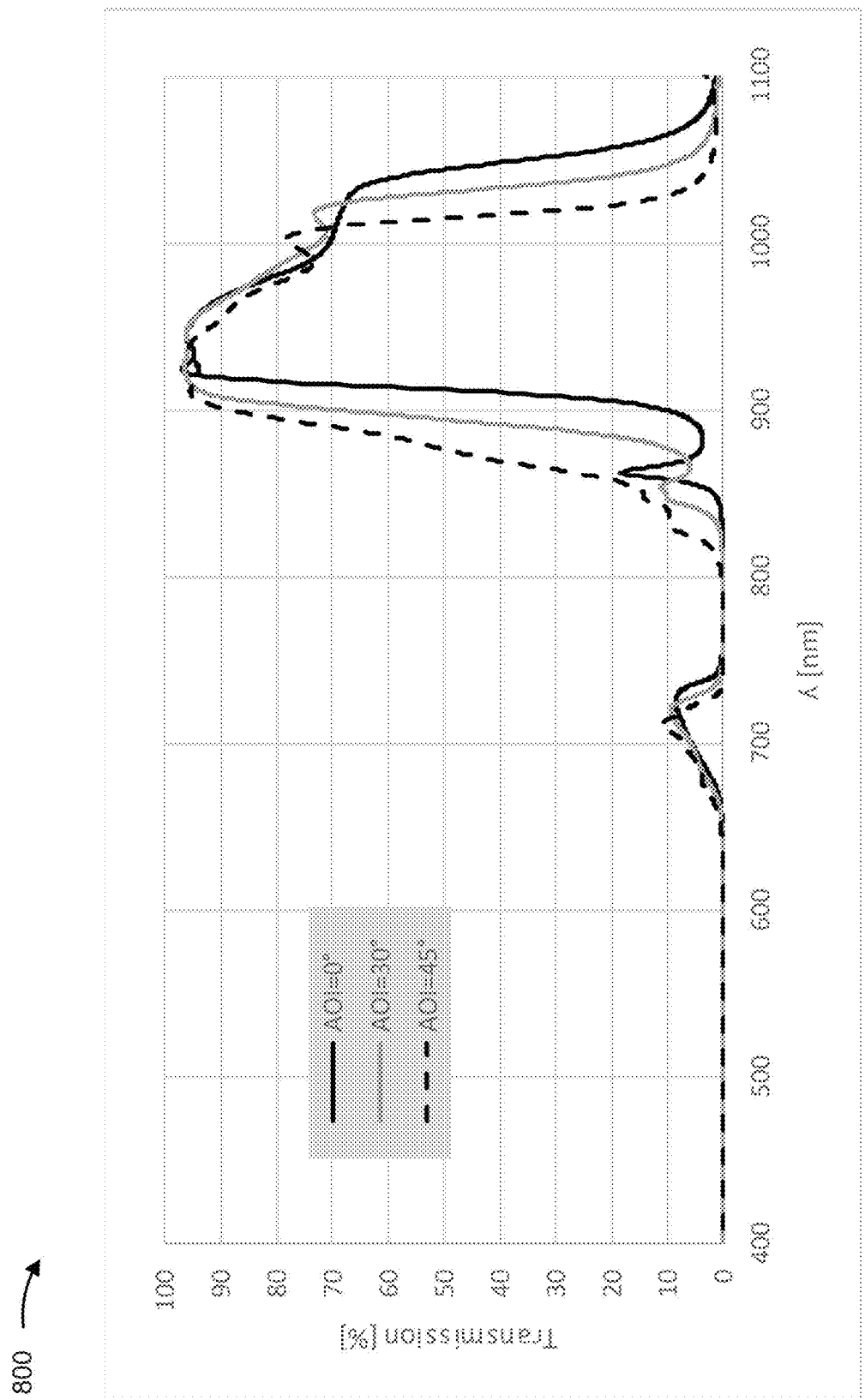

As shown in FIG. 8A, and by chart 800, a transmissivity may be determined for a sensor window and a particular spectral range. In this case, the sensor window may be a blue-colored anti-reflectance sensor window disposed on a borosilicate substrate, matched to an air environment, and exposed to collimated light. Moreover, the sensor window may be configured for a spectral range centered at 940 nm. As shown, at an angles of incidence from approximately 0 degrees to approximately 45 degrees, the transmissivity is less than 15% between approximately 400 nm and approximately 800 nm and is greater than 80% at approximately 940 nm.

Figure 8B:
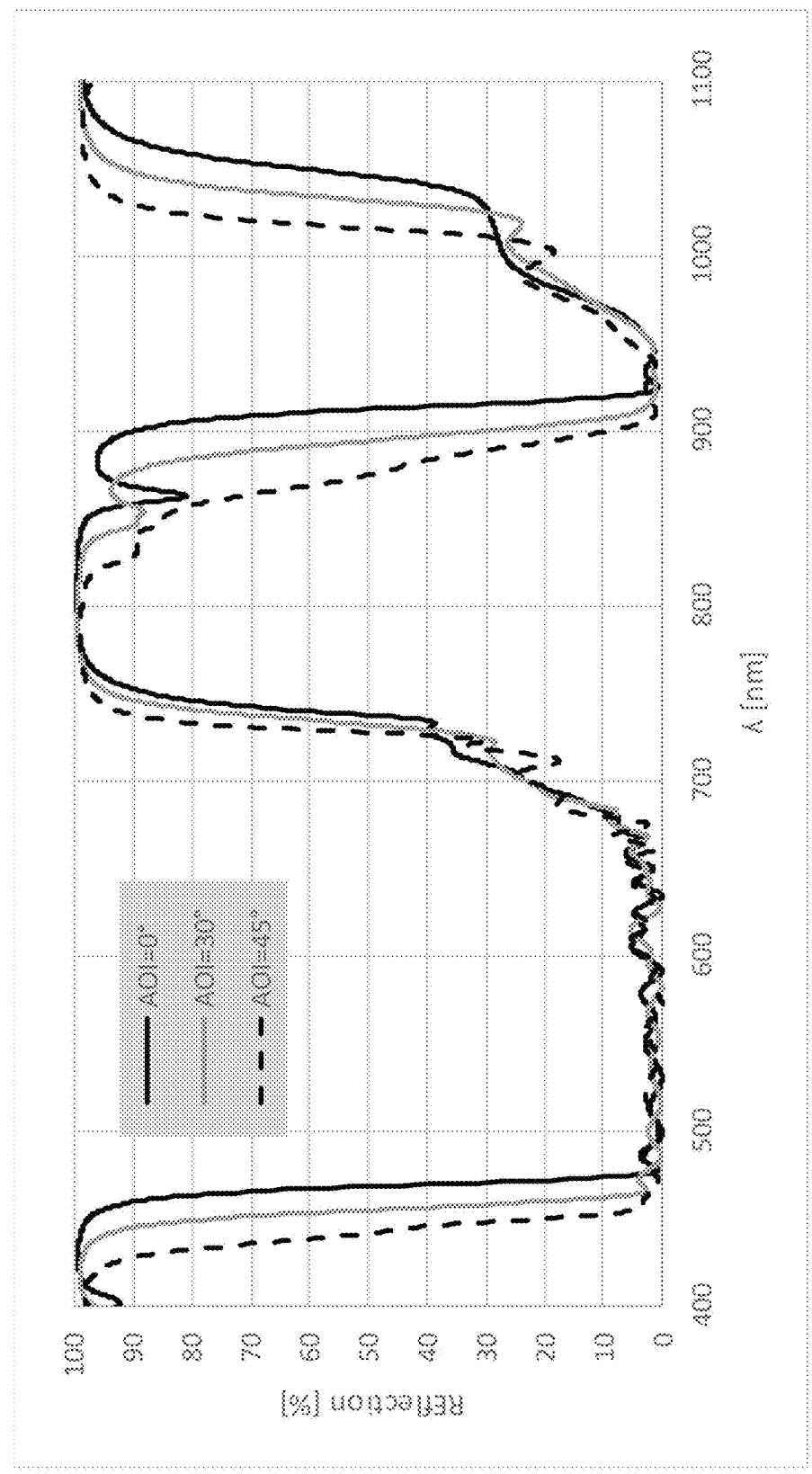

As shown in FIG. 8B, and by chart 810, a reflectance may be determined for the sensor window. In this case, reflectance may be less than 10% at a portion of the visible spectral range (e.g., approximately 500 nm to approximately 700 nm). In contrast, the reflectance may be greater than 90% at a spectral range less than approximately 500 nm, resulting in a blue color for the sensor window across a threshold range of angles of incidence.

Figure 8C:
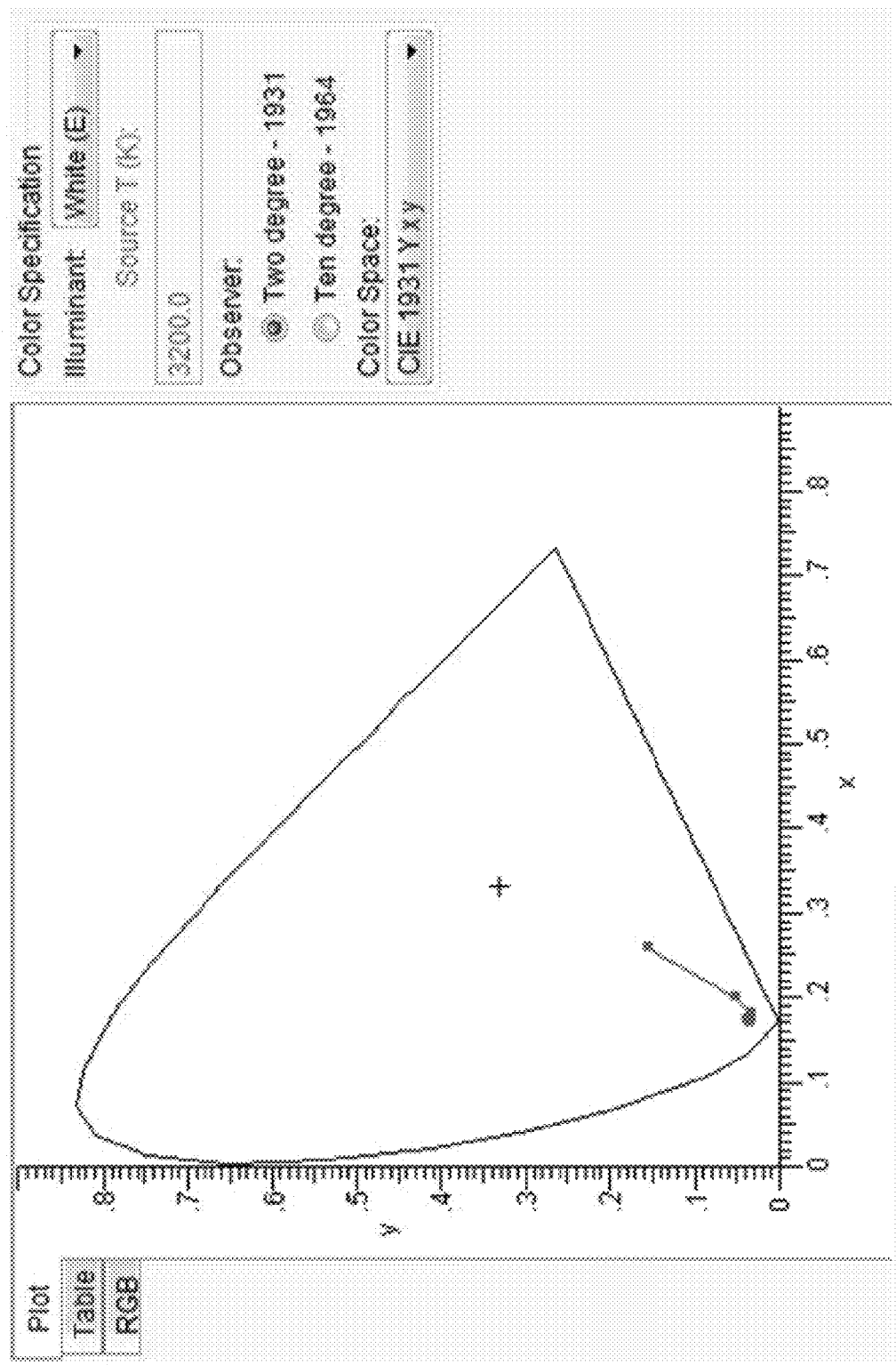
Figure 8D:
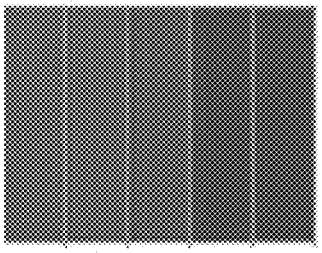

As shown in FIGS. 8C and 8D, and by charts 820 and 830, respectively, a color shift at angles of incidence from approximately 0 degrees to approximately 60 degrees may be determined. For example, the sensor window is associated with a color shift, at angles of incidence from approximately 0 degrees to approximately 60 degrees, of 105 ΔE, at angles of incidence from approximately 0 degrees to approximately 30 degrees of less than 12 ΔE, and/or the like. In this way, as shown in FIGS. 8A-8D, the sensor window enables transmission at near-infrared wavelengths and color-selectivity at visible wavelengths at a threshold range of angles of incidence, thereby improving performance relative to other techniques for manufacturing a sensor window.

As shown in FIG. 8E, and by chart 840, an example stackup is shown for the sensor window. For example, a first side of the sensor window (e.g., disposed on a first side of a substrate of the sensor window) may include alternating high refractive index layers (H layers) and low refractive index layers (L layers) matched to an air interface. A second side of the sensor window (e.g., disposed on a second side of the substrate of the sensor window) may include additional H layers and L layers. In this case, each layer may be associated with a configured thickness to provide optical performance described with regard to FIGS. 8A-8D.

As indicated above, FIGS. 8A-8E are provided merely as examples. Other examples are possible and may differ from what was described with regard to FIGS. 8A-8E.

In this way, a sensor window may be color-matched to, for example, an adjacent surface (e.g., a body color of a vehicle), such as within 1 ΔE, within 5 ΔE, within 10 ΔE, within 20 ΔE, within 30 ΔE, within 40 ΔE, within 100 ΔE, within 150 ΔE, and/or the like for angles of incidence from approximately 0 degrees to approximately 60 degrees or greater angles of incidence with reduced thickness, improved transmissivity, and/or the like relative to a pigment based sensor window. Moreover, the sensor window may enable a sharper transition between transmissivity at a sensing spectral range and color-selectivity at a visible spectral range, thereby improving sensing by a sensor element relative to a pigment based sensor window.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A system, comprising:
   a sensor window configured to:
      pass near-infrared light, and
      reflect one or more colors of light that are different from a color of a surface adjacent to the sensor window; and
   one or more of:
      a hydrophilic layer on an inner surface of the sensor window, or
      a hydrophobic layer on an outer surface of the sensor window.

2. The system of claim 1,
   wherein the one or more colors of light include black and white, and
   wherein, when reflecting the one or more colors of light, the sensor window is configured to appear as black and white vertical bars.

3. The system of claim 1, wherein the one or more colors of light include colors based on a logo of a manufacturer of a vehicle that includes the surface.

4. The system of claim 1, wherein the one or more colors of light include one or more bright colors including one or more of yellow or orange.

5. The system of claim 1, wherein the system comprises the hydrophilic layer.

6. The system of claim 1, further comprising:
   one or more sensor elements covered by the sensor window.

7. The system of claim 1, further comprising:
   a laminated coating that provides shatter resistance to the sensor window.

8. The system of claim 1, wherein the sensor window includes alternating high refractive index material layers and low refractive index material layers.

9. The system of claim 8, wherein the low refractive index material layers include one or more magnesium fluoride ($MgF_2$) layers.

10. The system of claim 1,
    wherein the sensor window includes:
       a first portion that is associated with one or more of a first thickness, a first arrangement of layers, or a first type of material, and
       a second portion that is associated with one or more of a second thickness, a second arrangement of layers, or a second type of material, and
    wherein the first portion is different from the second portion.

11. A sensor window comprising:
    a first set of layers; and a second set of layers,
the first set of layers and the second set of layers being configured to:
pass near-infrared light; and
reflect different colors of light that are different from a color of a surface adjacent to the sensor window.

12. The sensor window of claim 11, wherein the different colors of light are associated with black and white vertical bars.

13. The sensor window of claim 11, wherein the different colors of light are associated with camouflaged colors.

14. The sensor window of claim 11,
wherein the first set of layers are different from the second set of layers, and
wherein the first set of layers alternate with the second set of layers.

15. The sensor window of claim 11, wherein the second set of layers include one or more magnesium fluoride ($MgF_2$) layers.

16. A system, comprising:
a sensor window configured to:
pass near-infrared light, and
reflect one or more colors; and
a hydrophilic layer on an inner surface of the sensor window.

17. The system of claim 16, further comprising:
a hydrophobic layer on an outer surface of the sensor window.

18. The system of claim 16, wherein the one or more colors match a color of a surface adjacent to the sensor window.

19. The system of claim 16, wherein the sensor window enables a sensor to transmit the near-infrared light and receive reflected near-infrared signal without the near-infrared light being blocked by the sensor window.

20. The system of claim 16,
wherein the sensor window includes:
a first portion that is associated with a first thickness at a first cross-sectional region of the sensor window, and
a second portion that is associated with a second thickness at a second cross-sectional region of the sensor window, and
wherein the first thickness is different from the second thickness.

* * * * *